(12) United States Patent
Hotta et al.

(10) Patent No.: US 10,087,867 B2
(45) Date of Patent: Oct. 2, 2018

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Shintaro Hotta, Susono (JP);
Shinichiro Nogawa, Mishima (JP);
Hiroaki Mizoguchi, Mishima (JP);
Yasuyuki Irisawa, Susono (JP);
Masanori Hayashi, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/616,115

(22) Filed: Jun. 7, 2017

(65) Prior Publication Data

US 2017/0356379 A1  Dec. 14, 2017

(30) Foreign Application Priority Data

Jun. 9, 2016  (JP) .................................. 2016-115344

(51) Int. Cl.
*F02D 41/26* (2006.01)
*F02D 41/22* (2006.01)
(Continued)

(52) U.S. Cl.
CPC ......... *F02D 41/22* (2013.01); *F02D 41/0077* (2013.01); *F02D 41/1439* (2013.01);
(Continued)

(58) Field of Classification Search
CPC .. F02D 35/02; F02D 41/1438; F02D 41/1444; F02D 41/22; F02D 41/0077; F02D 41/1439; F02D 41/1454; F02D 41/263; F02D 2041/224; F02D 2200/024; F02D 2200/0611; F02M 26/13
(Continued)

(56) References Cited

U.S. PATENT DOCUMENTS

| 4,905,649 A | 3/1990 | Washino et al. |
|---|---|---|
| 2013/0035841 A1 | 2/2013 | Glugla et al. |
| 2016/0084174 A1 | 3/2016 | Bengtsson |

FOREIGN PATENT DOCUMENTS

| DE | 3833123 C2 | 9/1990 |
|---|---|---|
| DE | 102012211841 A1 | 2/2013 |

(Continued)

*Primary Examiner* — Hai Huynh
(74) *Attorney, Agent, or Firm* — Hunton Andrews Kurth LLP

(57) ABSTRACT

A control device for an internal combustion engine is provided. The internal combustion engine includes a cylinder, an in-cylinder pressure sensor, a fuel injection valve, and an alcohol concentration sensor. The control device includes an electronic control unit. The electronic control unit is configured to: carry out learning of fuel properties with the fuel injected from the fuel injection valve as a target; calculate a combustion speed parameter, showing a combustion speed, within the cylinder, of the fuel that is a learning target of the fuel properties, on a basis of the in-cylinder pressure; and determine that water is included in the fuel when the capacitance of the fuel detected by the alcohol concentration sensor is larger than a preset first threshold, and when the combustion speed of the fuel within the cylinder is smaller than a preset second threshold.

4 Claims, 7 Drawing Sheets

(51) Int. Cl.
*F02M 26/13* (2016.01)
*F02D 41/00* (2006.01)
*F02D 41/14* (2006.01)

(52) U.S. Cl.
CPC ....... *F02D 41/1454* (2013.01); *F02D 41/263* (2013.01); *F02M 26/13* (2016.02); *F02D 2041/224* (2013.01); *F02D 2200/024* (2013.01); *F02D 2200/0611* (2013.01)

(58) Field of Classification Search
USPC ................ 123/1 A, 435; 701/103–105, 111; 73/35.02, 35.12, 114.16
See application file for complete search history.

(56) References Cited

FOREIGN PATENT DOCUMENTS

| | | |
|---|---|---|
| DE | 112014001958 T5 | 1/2016 |
| JP | H06-93908 A | 4/1994 |
| JP | 2001-164999 A | 6/2001 |
| JP | 3767063 B2 | 4/2006 |
| JP | 5601232 B2 | 10/2014 |

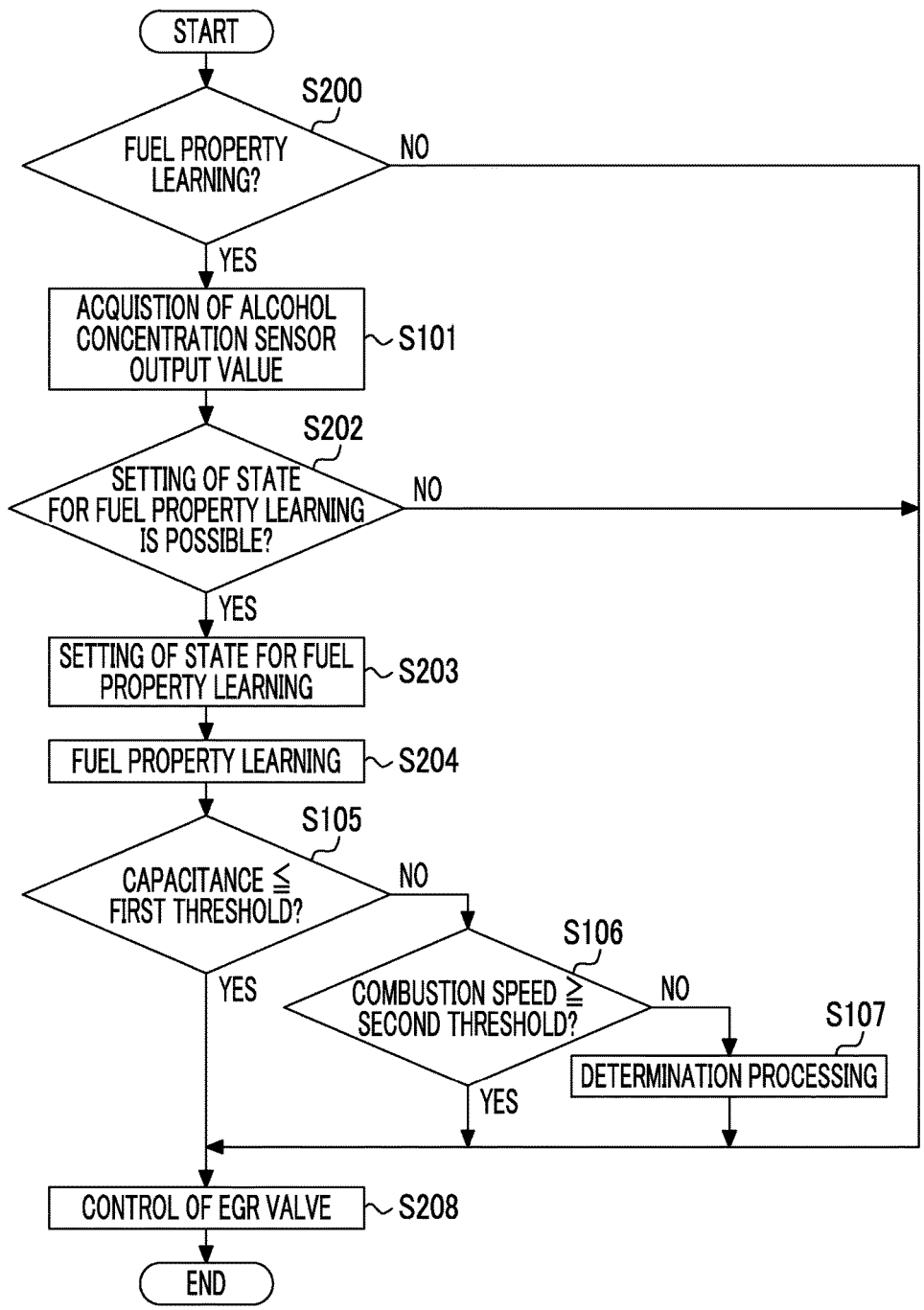

CONTROL DEVICE FOR INTERNAL COMBUSTION ENGINE

INCORPORATION BY REFERENCE

The disclosure of Japanese Patent Application No. 2016-115344 filed on Jun. 9, 2016 including the specification, drawings and abstract, is incorporated herein by reference in its entirety.

BACKGROUND

1. Technical Field

The present disclosure relates to a control device for an internal combustion engine having an in-cylinder pressure sensor and an alcohol concentration sensor.

2. Description of Related Art

In the related art, Internal combustion engines having an alcohol concentration sensor (methanol sensor) have been known. As an example of this type of internal combustion engine, for example, there is an internal combustion engine described in Japanese Patent Application Publication No. 6-93908 (JP 6-93908 A). In the internal combustion engine described in JP 6-93908 A, the amount of fuel injection is corrected on the basis of the concentration of alcohol (methanol) detected by the alcohol concentration sensor (methanol sensor).

SUMMARY

Meanwhile, the capacitance of fuel in which water is not included and alcohol (methanol) is included becomes larger than the capacitance of fuel in which neither water nor alcohol (methanol) is included. Additionally, the capacitance of fuel in which water is included and alcohol (methanol) is not included becomes larger than the capacitance of the fuel in which neither water nor alcohol (methanol) is included. For that reason, in a case where a capacitance type alcohol concentration sensor is used as the alcohol concentration sensor (methanol sensor) and in a case where means for discriminating whether water is included in the fuel or alcohol is included in the fuel is not provided, there is a concern that it is erroneously determined that alcohol is included in the fuel irrespective of whether water is included in the fuel. In the internal combustion engine described in JP 6-93908 A, the means for discriminating whether water is included in the fuel or alcohol is included in the fuel is not provided. Therefore, in the internal combustion engine described in JP 6-93908 A, in a case where the capacitance type alcohol concentration sensor is used as the alcohol concentration sensor (methanol sensor), there is a concern that it is erroneously determined that alcohol is included in the fuel irrespective of whether water is included in the fuel.

The present disclosure provides a control device for an internal combustion engine that can precisely determine that water is included in fuel.

A control device for an internal combustion engine related to an aspect of the present disclosure is provided. The internal combustion engine includes a cylinder, an in-cylinder pressure sensor, a fuel injection valve, and an alcohol concentration sensor. The in-cylinder pressure sensor is configured to detect an in-cylinder pressure that is a combustion pressure within the cylinder. The alcohol concentration sensor is configured to detect capacitance of fuel injected from the fuel injection valve. The control device includes an electronic control unit. The electronic control unit is configured to carry out learning of fuel properties with the fuel injected from the fuel injection valve as a target; calculate a combustion speed parameter, showing a combustion speed, within the cylinder, of the fuel that is a learning target of the fuel properties, on a basis of the in-cylinder pressure; and determine that water is included in the fuel when the capacitance of the fuel detected by the alcohol concentration sensor is larger than a preset first threshold, and when the combustion speed of the fuel within the cylinder is smaller than a preset second threshold.

It was found in the present inventors' earnest research that the combustion speed, within a cylinder, of fuel in which water is included and alcohol is not included becomes smaller than the combustion speed, within the cylinder, of fuel in which neither water nor alcohol is included, the combustion speed, within the cylinder, of the fuel that neither water nor alcohol is included becomes smaller than the combustion speed, within the cylinder, of the fuel in which water is not included and alcohol is included, and a combustion speed parameter showing the combustion speed of the fuel within the cylinder can be calculated on the basis of an in-cylinder pressure. In view of this point, in the control device of the internal combustion engine related to this aspect, when the capacitance of fuel is larger than the preset first threshold, that is, when a possibility that water is included in fuel and a possibility that alcohol is included in the fuel are present and it cannot be discriminated whether water is included in the fuel or alcohol is included in the fuel, the combustion speed, within the cylinder of the fuel that the combustion speed parameter calculated on the basis of the in-cylinder pressure shows and the preset second threshold are compared with each other. Moreover, when the combustion speed of the fuel within the cylinder is smaller than the second threshold, it is determined that water is included in the fuel. For that reason, it is possible to precisely determine that water is included in the fuel. Therefore, irrespective of whether water is included in the fuel, a concern that it is erroneously determined that alcohol is included in the fuel can be suppressed.

In the control device related to the above aspect, the electronic control unit may be configured to calculate the combustion speed parameter on a basis of the in-cylinder pressure, when fuel injection amount feedback control is executed in a state where an air excess ratio serving as a fuel injection amount feedback control target value is fixed to a preset value.

According to the control device for an internal combustion engine related to this aspect, water being included in the fuel can be precisely determined by calculating the combustion speed parameter when the fuel injection amount feedback control is executed in a state where the air excess ratio serving as the fuel injection amount feedback control target value is fixed to the preset value.

In the control device for an internal combustion engine related to the above aspect, the internal combustion engine may include an intake passage connected to the cylinder, an exhaust passage connected to the cylinder, an exhaust gas recirculation, hereinafter referred to as the EGR, passage that connects the intake passage and the exhaust passage together, and an EGR valve arranged in the EGR passage. The electronic control unit may be configured to calculate the combustion speed parameter on a basis of the in-cylinder pressure, when EGR valve feedback control is executed in a state where an EGR rate serving as an EGR valve feedback control target value is fixed to a preset value larger than zero.

According to the control device for an internal combustion engine related to this aspect, water being included in the fuel can be precisely determined by calculating the combustion speed parameter when the EGR valve feedback control is executed in a state where the EGR rate serving as the EGR valve feedback control target value is fixed to the preset value larger than zero.

In the control device for an internal combustion engine related to the above aspect, the internal combustion engine may include a reporting device that reports an abnormality. The electronic control unit may be configured to operate the reporting device when the electronic control unit has determined that water is included in the fuel that is the learning target of the fuel properties.

According to the control device for an internal combustion engine related to this aspect, since the reporting device is made to operate when water is included in the fuel, a driver can be made to ascertain that water is included in the fuel.

As shown above, according to the control device for an internal combustion engine related to the above aspect, it is possible to precisely determine that water is included in the fuel.

BRIEF DESCRIPTION OF THE DRAWINGS

Features and advantages, and technical and industrial significance of exemplary embodiments of the present disclosure will be described below with reference to the accompanying drawings, in which like numerals denote like elements, and wherein:

FIG. 8 is a flowchart for explaining EGR valve control executed by the control device of the internal combustion engine of the first embodiment.

DETAILED DESCRIPTION OF EMBODIMENTS

Figure 1:
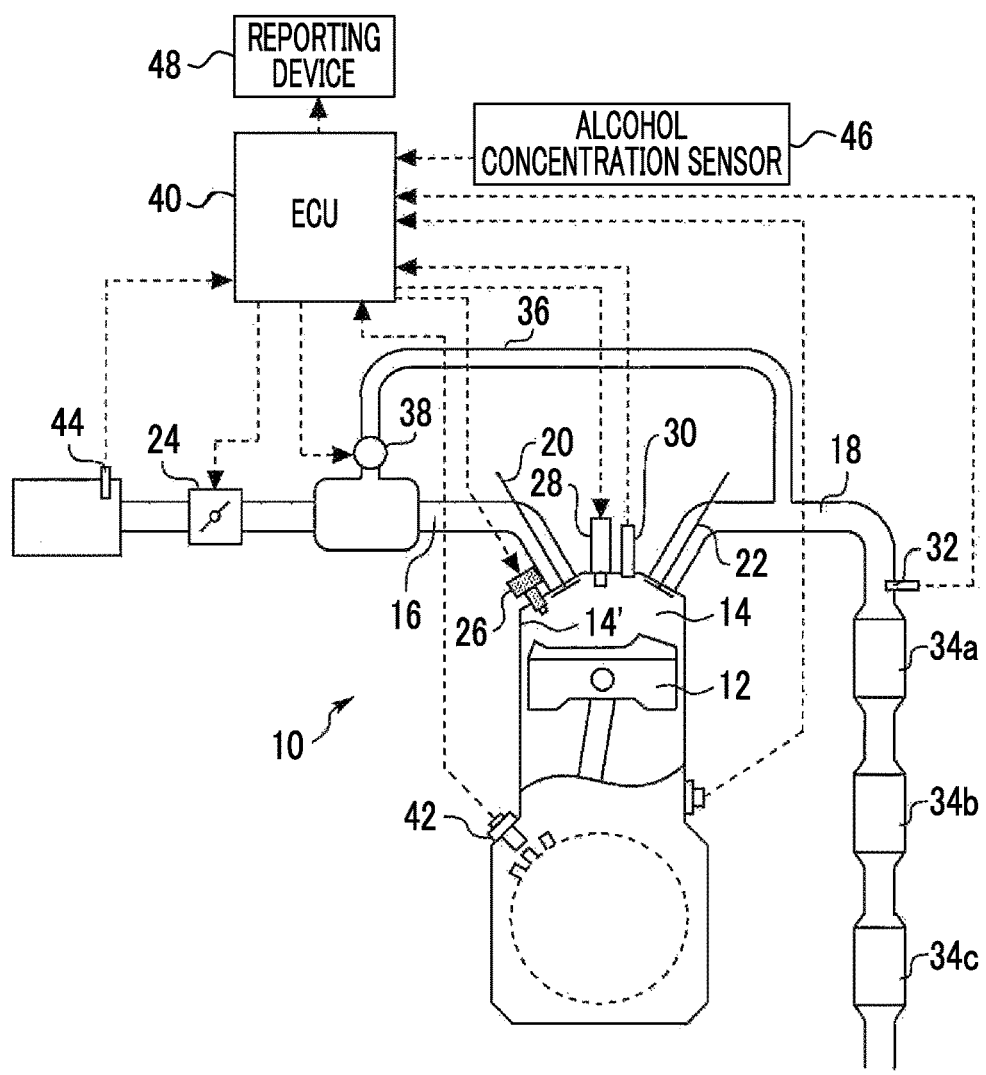
FIG. 1 is a schematic configuration diagram of an engine system to which a control device of an internal combustion engine of a first embodiment is applied.
Figure 2:
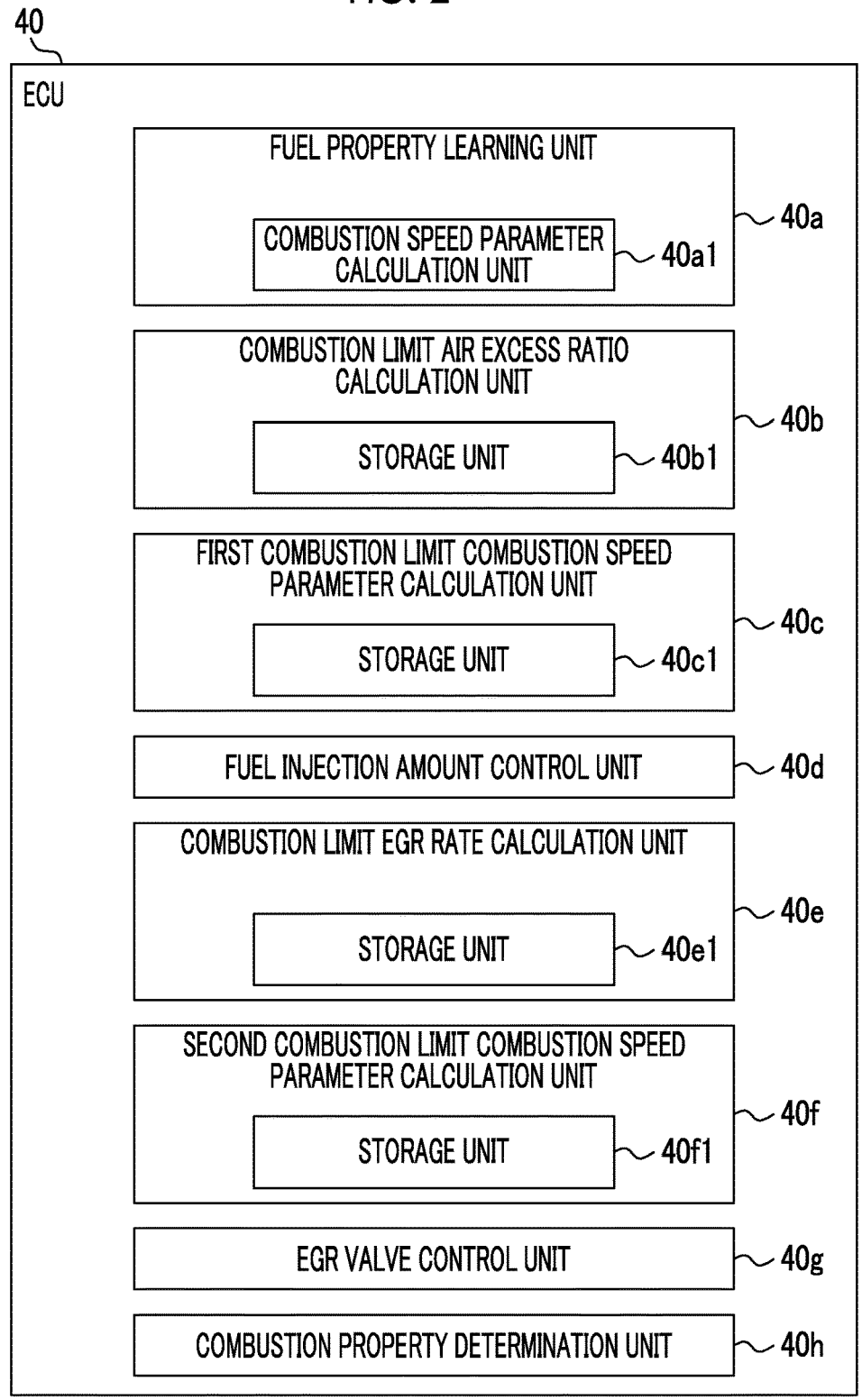
FIG. 2 is a block diagram of functions executed by an electronic control unit 40 in FIG. 1.

Hereinafter, a first embodiment of a control device of an internal combustion engine of the present disclosure will be described. FIG. 1 is a schematic configuration diagram of an engine system to which the control device of the internal combustion engine of the first embodiment is applied. FIG. 2 is a block diagram of functions executed by an electronic control unit (ECU) 40 in FIG. 1. An internal combustion engine 10 is provided in an example illustrated in FIG. 1 of the engine system to which the control device of the internal combustion engine of the first embodiment is applied. A piston 12 is arranged within a cylinder 14' of the internal combustion engine 10. A combustion chamber 14 is formed on a top part side of the piston 12 within the cylinder 14'. An intake passage 16 and an exhaust passage 18 communicate with the combustion chamber 14. An intake port that constitutes a portion of the intake passage 16 is provided with an intake valve 20 that opens and closes the intake port. That is, the cylinder 14' and the intake passage 16 are connected together via the intake valve 20. Moreover, an exhaust port that constitutes a portion of exhaust passage 18 is provided with an exhaust valve 22 that opens and closes an exhaust port. That is, the cylinder 14' and the exhaust passage 18 are connected together via the exhaust valve 22. Additionally, the intake passage 16 is provided with a throttle valve 24. Moreover, for example the air excess ratio sensor 32, for example, a ternary catalyst 34a, for example, an NOx occlusion reduction catalyst 34b, and for example, an NOx selection reduction catalyst 34c are arranged in the exhaust passage 18. Additionally, an EGR passage 36 that connects the intake passage 16 and the exhaust passage 18 together is provided. An EGR valve 38 is arranged in the EGR passage 36.

Although only one the cylinder 14' is illustrated in FIG. 1, other cylinders (not illustrated) are also provided in the example illustrated in FIG. 1 besides the cylinder 14'. In the example illustrated in FIG. 1, the control device of the internal combustion engine of the first embodiment is applied to the internal combustion engine 10 having the plurality of cylinders. However, the control device of the internal combustion engine of the first embodiment can also be applied to an internal combustion engine having only one cylinder in another example. In the example illustrated in FIG. 1 to which the control device of the internal combustion engine of the first embodiment is applied, the air excess ratio is detected by the air excess ratio sensor 32. However, in other example to which the control device of the internal combustion engine of the first embodiment is applied, instead, the air excess ratio sensor 32 is omitted, and for example, the air excess ratio can also be calculated using the amount of intake air detected by an air flow meter 44 to be described below, and the amount of fuel injection. The calculation of such an air excess ratio is described in, for example in Paragraph 0014 of Japanese Patent No. 3767063.

In the example illustrated in FIG. 1 of the engine system to which the control device of the internal combustion engine of the first embodiment is applied, each cylinder of the internal combustion engine 10 is provided with a fuel injection valve 26 for injecting fuel directly into the combustion chamber 14 (the inside of the cylinder 14') and an ignition plug 28 for igniting an air-fuel mixture. An alcohol concentration sensor 46 that detects the capacitance of fuel to be injected from the fuel injection valve 26 is arranged between the fuel injection valve 26 and a fuel tank (not illustrated). Moreover, an in-cylinder pressure sensor 30 for detecting in-cylinder pressure P that is combustion pressure within each cylinder is assembled into the cylinder.

In the example illustrated in FIG. 1 to which the control device of the internal combustion engine of the first embodiment is applied, in-cylinder pressure sensors 30 are respectively arranged in all the plurality of cylinders. However, in another example to which the control device of the internal combustion engine of the first embodiment is applied, instead, a cylinder in which the in-cylinder pressure sensor 30 is arranged, and a cylinder in which the in-cylinder pressure sensor 30 is not arranged are provided, and the in-cylinder pressure P of the cylinder in which the in-cylinder pressure sensor 30 is not arranged can also be estimated from the in-cylinder pressure P detected by the in-cylinder pressure sensor 30 in the cylinder in which the in-cylinder pressure sensor 30 is arranged. In the example illustrated in FIG. 1, the control device of the internal combustion engine of the first embodiment is applied to the internal combustion engine 10 in which fuel is directly injected into the cylinder 14' from the fuel injection valve 26. However, in another example, the control device of the internal combustion engine of the first embodiment can also be applied to an internal combustion engine in which fuel is injected into an intake port from a fuel injection valve. Additionally, in the example illustrated in FIG. 1, the control device of the internal combustion engine of the first embodiment is applied to the internal combustion engine 10 provided with the ignition plug 28. In another example, the control device of the internal combustion engine of the first embodiment can also be applied to the internal combustion engine 10 that is not provided with the ignition plug 28. In the example illustrated in FIG. 1 to which the control device of the internal combustion engine of the first embodiment is applied, a turbocharger (not illustrated) is not provided in the engine system. However, in another example to which the control device of the internal combustion engine of the first embodiment is applied, instead, the turbocharger can also be provided in the engine system. In an example in which the turbocharger is provided in the engine system, a compressor (not illustrated) of the turbocharger is arranged in a portion closer to an upstream side than the throttle valve 24 of the intake passages 16, and a turbine (not illustrated) of the turbocharger is arranged in the exhaust passage 18. In detail, in one example in which the control device of the internal combustion engine of the first embodiment is applied and the turbocharger is provided in the engine system, a low-pressure EGR system is configured by connecting a portion of the intake passage 16 closer to the upstream side than the compressor, and a portion of the exhaust passage 18 closer to the downstream side than the turbine together by the EGR passage 36. In another example in which the control device of the internal combustion engine of the first embodiment is applied and the turbocharger is provided in the engine system, a high-pressure EGR system is configured by connecting a portion of the intake passage 16 closer to the downstream side than, for example, a throttle valve 24, and a portion of the exhaust passage 18 closer to the upstream side than the turbine together by the EGR passage 36. The control device of the internal combustion engine of the first embodiment can also be applied to any of an engine system having the low-pressure EGR system, an engine system having the high-pressure EGR system, and an engine system having the low-pressure EGR system and the high-pressure EGR system.

Additionally, in the engine system illustrated in FIG. 1 to which the control device of the internal combustion engine of the first embodiment is applied, for example, a reporting device 48, such as an alarm lamp (Malfunction Indicator Lamp (MIL)), indicating abnormalities, such as a failure, for example, is provided. Moreover, the engine system illustrated in FIG. 1 to which the control device of the internal combustion engine of the first embodiment is applied is equipped with the electronic control unit (ECU) 40 that functions as the control device. In addition to the above-described alcohol concentration sensor 46 and in-cylinder pressure sensor 30, various sensors for acquiring the operational state of the internal combustion engine 10, such as a crank angle sensor 42 for acquiring an engine rotation speed and the air flow meter 44 for metering the amount of intake air are connected to an input unit of the ECU 40. Additionally, various actuators for controlling the operation of the internal combustion engine 10, such as the above-described throttle valve 24, fuel injection valve 26, ignition plug 28, and EGR valve 38 are connected to an output unit of the ECU 40. The ECU 40 performs engine control, such as the fuel injection amount control and the EGR valve control by driving the above various actuators on the basis of the output of those sensors and preset programs. Additionally, the ECU 40 has the function of AD-converting and acquiring an output signal of the in-cylinder pressure sensor 30 in synchronization with a crank angle. Accordingly, the in-cylinder pressure P at an arbitrary crank angle timing can be detected in a range where the resolving power of AD conversion allows.

In the engine system illustrated in FIG. 1 equipped with the in-cylinder pressure sensor 30 and the crank angle sensor 42, in-cylinder pressure data (cylinder pressure waveforms) can be acquired by a crank angle base in each cycle of the internal combustion engine 10. Also, a mass fraction burned MFB can be calculated using the cylinder pressure waveforms after absolute-pressure correction is performed by a well-known technique. Specifically, the amount Q of heat generation within the cylinder 14' at an arbitrary crank angle θ can be calculated, for example, according to the following Formula 1, using the in-cylinder pressure data. Also, the mass fraction burned MFB [%] at the arbitrary crank angle θ can be calculated, for example, according to the following Formula 2, using the data of the calculated amount Q of heat generation within the cylinder 14'. Hence, a crank angle (CAP) when the mass fraction burned MFB becomes a preset fraction 13 [%] can be acquired using Formula 2.

$$Q = \int PdV + \frac{1}{\kappa - 1}(PV - P_0 V_0) \quad \text{(Formula 1)}$$

$$MFB = \frac{Q(\theta) - Q(\theta_{sta})}{Q(\theta_{fin}) - Q(\theta_{sta})} \quad \text{(Formula 2)}$$

In the above Formula 1, P is the in-cylinder pressure, V is cylinder volume, and κ is the ratio of specific heat of in-cylinder gas. Additionally, $P_0$ and $V_0$ are preset in-cylinder pressure and cylinder volume of a calculation starting point $\theta_0$ (a preset crank angle during a compression stroke (here, after the closing of the intake valve 20) determined with a margin with respect to a combustion starting point assumed). Additionally, in the above Formula 2, $v_{sta}$ is the combustion starting point (CA0), and $\theta_{fin}$ is a combustion finishing point (CA100).

That is, in the example illustrated in FIG. 1 to which the control device of the internal combustion engine of the first embodiment is applied, the amount Q of heat generation is calculated in the ECU 40, for example, on the basis of the in-cylinder pressure P detected by the in-cylinder pressure sensor 30, the cylinder volume V, and for example, Formula 1. Additionally, the ECU 40 can calculate the mass fraction burned MFB on the basis of the amount Q of heat generation, and for example, Formula 2. Moreover, the ECU 40 can calculate heat release rate (dQ/dθ) that is the amount Q of heat generation per unit crank angle, for example, on the basis of the following Formula 3.

$$\frac{dQ}{d\theta} = \frac{1}{\kappa-1}V\frac{dP}{d\theta} + \frac{\kappa}{\kappa-1}P\frac{dV}{d\theta} \qquad \text{(Formula 3)}$$

Next, a representative crank angle will be described. The combustion within the cylinder 14' is started with ignition delay after an air-fuel mixture is ignited at an ignition timing. This combustion starting point, that is, a point showing that the mass fraction burned MFB rises, is equivalent to the crank angle (CA0). A crank angle period (CA0-CA10) up to the crank angle (CA10) when the mass fraction burned MFB becomes 10% from the crank angle (CA0) is equivalent to an initial combustion period, a crank angle period (CA10-CA90) up to the crank angle (CA90) when the mass fraction burned MFB becomes 90% from the crank angle (CA10) is equivalent to a main combustion period. Additionally, a crank angle (CA50) when the mass fraction burned MFB becomes 50% is equivalent to a combustion gravity center. As a low-fuel-consumption technique of the internal combustion engine, a lean burn operation in which a target air excess ratio is set to an air excess ratio (the value of the air excess ratio is larger than 1) leaner than a theoretical air-fuel ratio (the value of the air excess ratio is 1) is effective. As the air-fuel ratio becomes leaner (that is, the air excess ratio becomes larger), fuel efficiency becomes better, and the amount of NOx emission decreases. Here, if the air-fuel ratio is made to be excessively lean (if the air excess ratio is made excessively large), combustion deteriorates, and thereby, the fuel efficiency deteriorates. On the other hand, as the air-fuel ratio becomes lean (that is, the air excess ratio becomes large), torque fluctuation become gradually large. As a result, if the air-fuel ratio become lean beyond a certain value (that is, the air excess ratio exceeds a value equivalent to the value), the torque fluctuation becomes rapidly large. In order to realize low fuel consumption and low NOx emission, it can be said that it is preferable that the state of the internal combustion engine 10 is monitored and the air-fuel ratio is controlled to become as lean as possible (that is, the air excess ratio is controlled to become as large a value as possible) within a range where drivability does not deteriorate. In view of the above-described point, the lean burn operation can be executed in the example illustrated in FIG. 1 to which the control device of the internal combustion engine of the first embodiment is applied.

In detail, in the example illustrated in FIG. 1 to which the control device of the internal combustion engine of the first embodiment is applied, in a case where the lean burn operation is executed, the in-cylinder pressure P is detected by the in-cylinder pressure sensor 30, and the amount Q of heat generation is calculated on the basis of the in-cylinder pressure P and, for example, Formula 1 by the ECU 40. Additionally, the mass fraction burned MFB is calculated on the basis of the amount Q of heat generation and, for example, Formula 2 by the ECU 40. Moreover, in an example illustrated in FIGS. 1 and 2 to which the control device of the internal combustion engine of the first embodiment is applied, in a case where the lean burn operation is executed, a crank angle period (SA-CA10) that is a period until the crank angle (CA10) when the mass fraction burned MFB becomes, for example, 10% is obtained is calculated from a crank angle (SA) equivalent to an ignition timing by a combustion speed parameter calculation unit 40a1 (refer to FIG. 2) executed by the ECU 40 (refer to FIGS. 1 and 2). That is, in the example illustrated in FIGS. 1 and 2 to which the control device of the internal combustion engine of the first embodiment is applied, in a case where the lean burn operation is executed, the crank angle period (SA-CA10) is used as a combustion speed parameter showing the combustion speed of the fuel within the cylinder 14' (refer to FIG. 1). Moreover, the crank angle period (SA-CA10) is calculated by the combustion speed parameter calculation unit 40a1 on the basis of the in-cylinder pressure P. In detail, in the example illustrated in FIGS. 1 and 2 to which the control device of the internal combustion engine of the first embodiment is applied, when the combustion speed of the fuel injected from the fuel injection valve 26 (refer to FIG. 1) is large, the value of the crank angle period (SA-CA10) as the combustion speed parameter calculated by the combustion speed parameter calculation unit 40a1 becomes small. That is, the time required for combustion becomes short. On the other hand, when the combustion speed of the fuel injected from the fuel injection valve 26 is small, the value of the crank angle period (SA-CA10) as the combustion speed parameter calculated by the combustion speed parameter calculation unit 40a1 becomes large. That is, the time required for combustion becomes long.

In the example illustrated in FIGS. 1 and 2 to which the control device of the internal combustion engine of the first embodiment is applied, in a case where the lean burn operation is executed, the crank angle period (SA-CA10) is calculated on the basis of the in-cylinder pressure P by the combustion speed parameter calculation unit 40a1 (refer to FIG. 2) and is used as the combustion speed parameter showing the combustion speed of the fuel within the cylinder 14' (refer to FIG. 1). However, in another example to which the control device of the internal combustion engine of the first embodiment is applied, instead, in a case where the lean burn operation is executed, a crank angle period (SA-CAα) (α is an arbitrary value from 0 to 100 excluding 10) can also be used as the combustion speed parameter showing the combustion speed of the fuel within the cylinder 14'. Otherwise, in still another example to which the control device of the internal combustion engine of the first embodiment is applied, instead, in a case where the lean burn operation is executed, a maximum value of the above-described heat release rate (dQ/dθ) can be calculated on the basis of the in-cylinder pressure P by the combustion speed parameter calculation unit 40a1, and can also be used as the combustion speed parameter showing the combustion speed of the fuel within the cylinder 14'. In this example, when the combustion speed of the fuel injected from the fuel injection valve 26 (refer to FIG. 1) is large, the maximum value of the heat release rate (dQ/dθ) as the combustion speed parameter calculated by the combustion speed parameter calculation unit 40a1 becomes large. On the other hand, when the combustion speed of the fuel injected from the fuel injection valve 26 is small, the maximum value of the heat release rate (dQ/dθ) as the combustion speed parameter calculated by the combustion speed parameter calculation unit 40a1 becomes small.

In the example illustrated in FIG. 2 to which the control device of the internal combustion engine of the first embodiment is applied, the fuel injection amount control unit 40d that control the injection amount of the fuel injected from the fuel injection valve 26 (refer to FIG. 1) is executed by the ECU 40. In detail, in the example illustrated in FIG. 2 to which the control device of the internal combustion engine of the first embodiment is applied, in a case where the lean burn operation is executed, fuel injection amount feedforward control is executed by the fuel injection amount control unit 40d during a transient operation of the internal combustion engine 10 (refer to FIG. 1). During the transient operation of the internal combustion engine 10, the combustion limit air excess ratio calculated by a combustion limit air excess ratio calculation unit 40b executed by the ECU 40 is used as a target value of the fuel injection amount feedforward control. The combustion limit air excess ratio shows an air excess ratio (that is, an air excess ratio set to as large value as possible within a range where combustion does not deteriorate) corresponding to a combustion limit. That is, during the transient operation of the internal combustion engine 10, the fuel injection amount feedforward control based on the combustion limit air excess ratio is executed by the fuel injection amount control unit 40d. Moreover, in the example illustrated in FIG. 2 to which the control device of the internal combustion engine of the first embodiment is applied, in a case where the lean burn operation is executed, fuel injection amount feedback control is executed by the fuel injection amount control unit 40d during a steady operation of the internal combustion engine 10. During the steady operation of the internal combustion engine 10, a combustion limit combustion speed parameter calculated by a first combustion limit combustion speed parameter calculation unit 40c executed by the ECU 40 is used as a target value of the fuel injection amount feedback control. The combustion limit combustion speed parameter shows a combustion speed (that is, the combustion speed of fuel in a state where the air excess ratio is set to as large value as possible within a range where combustion does not deteriorate) of the fuel within the cylinder 14' (refer to FIG. 1) corresponding to the combustion limit. That is, during the steady operation of the internal combustion engine 10, the fuel injection amount feedback control based on the combustion limit combustion speed parameter is executed by the fuel injection amount control unit 40d.

Figure 3:
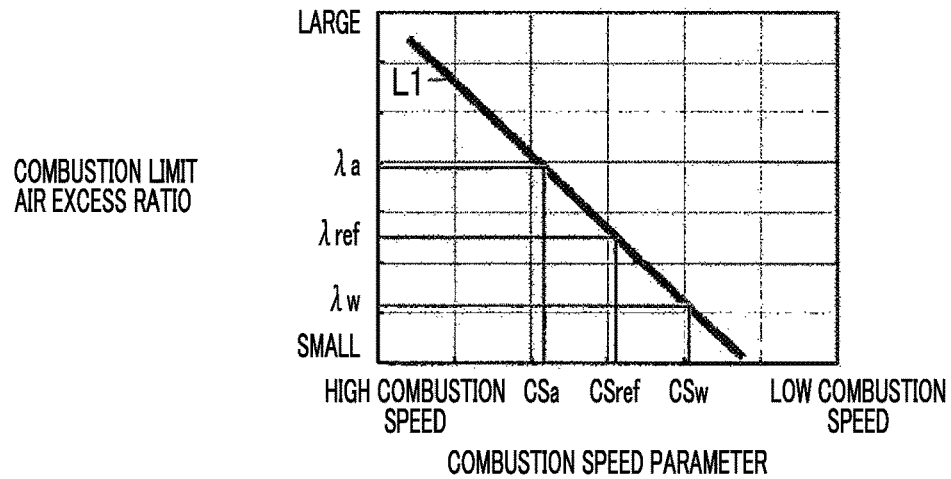
FIG. 3 is a view illustrating a relationship between a combustion speed parameter and a combustion limit air excess ratio, and the like, which is applied to the control device of the internal combustion engine of the first embodiment.

FIG. 3 is a view illustrating a relationship between the combustion speed parameter and the combustion limit air excess ratio, and the like, which is applied to the control device of the internal combustion engine of the first embodiment. In detail, an upper view of FIG. 3 illustrates the relationship between the combustion speed parameter and the combustion limit air excess ratio, which is applied to the control device of the internal combustion engine of the first embodiment, and a lower view of FIG. 3 illustrates a relationship between the combustion speed parameter and the combustion limit combustion speed parameter, which is applied to the control device of the internal combustion engine of the first embodiment. In an example illustrated in FIG. 3 to which the control device of the internal combustion engine of the first embodiment is applied, as illustrated by a straight line L1, the value of the combustion limit air excess ratio that should be a fuel injection amount feedforward control target value during the transient operation becomes larger as the combustion speed of the fuel within the cylinder 14' (refer to FIG. 1) becomes larger.

In detail, in the control device of the internal combustion engine of the first embodiment, as illustrated in FIG. 3, when the combustion speed parameter showing the combustion speed of the fuel within the cylinder 14' (refer to FIG. 1) changes, for example, from a value CSa to a value CSref with a change in the properties of the fuel injected from the fuel injection valve 26 (refer to FIG. 1), the combustion limit air excess ratio that is the fuel injection amount feedforward control target value during the transient operation is changed from a value λ a to a value λ ref by the combustion limit air excess ratio calculation unit 40b (refer to FIG. 2) on the basis of a first relationship illustrated by the straight line L1. For that reason, in the control device of the internal combustion engine of the first embodiment, as a change in the combustion limit air excess ratio that is the fuel injection amount feedforward control target value during the transient operation is maintained at the value λ a when the combustion speed parameter changes from the value CSa to the value CSref with the change in the properties of the fuel injected from the fuel injection valve 26, a concern that the torque fluctuation may occur during a lean burn transient operation can be suppressed.

Additionally, in the control device of the internal combustion engine of the first embodiment, as illustrated in FIG. 3, when the combustion speed parameter showing the combustion speed of the fuel within the cylinder 14' (refer to FIG. 1) with a change in the properties of the fuel injected from the fuel injection valve 26 (refer to FIG. 1) changes, for example from the value CSref to the value CSa, the combustion limit air excess ratio that is the fuel injection amount feedforward control target value during the transient operation is changed from the value λ ref to the value λ a by the combustion limit air excess ratio calculation unit 40b (refer to FIG. 2) on the basis of a first relationship illustrated by the straight line L1. For that reason, in the control device of the internal combustion engine of the first embodiment, as a change in the combustion limit air excess ratio that is the fuel injection amount feedforward control target value during the transient operation is maintained at the value λ ref when the combustion speed parameter changes from the value CSref to the value CSa with the change in the properties of the fuel injected from the fuel injection valve 26, a concern that the emission during the lean burn transient operation may deteriorate can be suppressed. In the example illustrated in FIG. 2 to which the control device of the internal combustion engine of the first embodiment is applied, the first relationship illustrated by the straight line L1 (refer to FIG. 3) is obtained in advance, for example, by experiment or the like, and is stored, for example, in a storage unit 40b1 of the combustion limit air excess ratio calculation unit 40b. In an example illustrated in FIG. 3 to which the control device of the internal combustion engine of the first embodiment is applied, for example, the approximated straight line L1 is used as a line showing that the first relationship in which the combustion limit air excess ratio becomes larger as the combustion speed of the fuel within the cylinder 14' becomes larger. However, in another example to which the control device of the internal combustion engine of the first embodiment is applied, for example, an arbitrary line other than the straight line, such as a map, can also be used as the line showing the first relationship in which the combustion limit air excess ratio becomes larger as the combustion speed of the fuel within the cylinder 14' becomes larger.

Moreover, in the example illustrated in FIG. 3 to which the control device of the internal combustion engine of the first embodiment is applied, as illustrated by a straight line L2, the combustion speed (refer to a horizontal axis of FIG. 3) of the fuel within the cylinder 14' at the time of the combustion limit (in detail, when the air excess ratio is made to be large up to the combustion limit) becomes larger as the combustion speed (refer to a vertical axis of FIG. 3) of fuel within the cylinder 14' (refer to FIG. 1) at the time of a non-combustion limit becomes larger.

In detail, in the control device of the internal combustion engine of the first embodiment, as illustrated in FIG. 3, when the combustion speed parameter (refer to the horizontal axis of FIG. 3) showing the combustion speed of the fuel within the cylinder 14' (refer to FIG. 1) changes, for example, from the value CSa to the value CSref with a change in the properties of the fuel injected from the fuel injection valve 26 (refer to FIG. 1), the combustion limit combustion speed parameter (refer to the vertical axis of FIG. 3) showing the combustion speed of the fuel within the cylinder 14' corresponding to the combustion limit (in detail, the combustion limit caused by the air excess ratio being large) that is the fuel injection amount feedback control target value during the steady operation is changed from a value CSa' to a value CSref on the basis of a second relationship illustrated by the straight line L2, for example, by the first combustion limit combustion speed parameter calculation unit 40c (refer to FIG. 2). For that reason, in the control device of the internal combustion engine of the first embodiment, as the combustion limit combustion speed parameter (refer to the vertical axis of FIG. 3) that is the fuel injection amount feedback control target value during the steady operation is maintained at the value CSa' when the combustion speed parameter (refer to the horizontal axis of FIG. 3) changes, for example, from the value CSa to the value CSref with a change in the properties of the fuel injected from the fuel injection valve 26, a concern that the torque fluctuation may occur during a lean burn steady operation can be suppressed.

Additionally, in the control device of the internal combustion engine of the first embodiment, as illustrated in FIG. 3, when the combustion speed parameter (refer to the horizontal axis of FIG. 3) showing the combustion speed of the fuel within the cylinder 14' (refer to FIG. 1) changes from the value CSref to the value CSa with a change in the properties of the fuel injected from the fuel injection valve 26 (refer to FIG. 1), the combustion limit combustion speed parameter (refer to the vertical axis of FIG. 3) that is the fuel injection amount feedback control target value during the steady operation is changed from the value CSref to the value CSa', for example, by the first combustion limit combustion speed parameter calculation unit 40c (refer to FIG. 2), on the basis of the second relationship illustrated by the straight line L2. For that reason, in the control device of the internal combustion engine of the first embodiment, as the combustion limit combustion speed parameter (refer to the vertical axis of FIG. 3) that is the fuel injection amount feedback control target value during the steady operation is maintained at the value CSref when the combustion speed parameter (refer to the horizontal axis of FIG. 3) changes, for example, from the value CSref to the value CSa with a change in the properties of the fuel injected from the fuel injection valve 26, a concern that the emission during the lean burn steady operation may deteriorate can be suppressed. In the example illustrated in FIG. 2 to which the control device of the internal combustion engine of the first embodiment is applied, the second relationship illustrated by the straight line L2 (refer to FIG. 3) is obtained in advance, for example, by experiment or the like, and is stored in a storage unit 40c1 of the first combustion limit combustion speed parameter calculation unit 40c realized by a program to be executed, for example, by the ECU 40. In the example illustrated in FIG. 3 to which the control device of the internal combustion engine of the first embodiment is applied, for example, the approximated straight line L2 is used as a line showing the second relationship in which the combustion speed of the fuel within the cylinder 14' corresponding to the combustion limit becomes larger as the combustion speed of fuel within the cylinder 14' becomes larger. However, in another example to which the control device of the internal combustion engine of the first embodiment is applied, for example, an arbitrary line other than the straight line, such as a map, can also be used as a line showing the second relationship in which the combustion speed of the fuel within the cylinder 14' corresponding to the combustion limit becomes larger as the combustion speed of fuel within the cylinder 14' becomes larger.

In the example illustrated in FIG. 2 to which the control device of the internal combustion engine of the first embodiment is applied, when an actual combustion speed corresponding to the combustion speed parameter calculated by the combustion speed parameter calculation unit 40a1 during the execution of the fuel injection amount feedback control during the steady operation is smaller than a target combustion speed corresponding to the combustion limit combustion speed parameter that is the fuel injection amount feedback control target value during the steady operation, for example, the amount of fuel injection is increased by the fuel injection amount control unit 40d in order to increase the actual combustion speed up to the target combustion speed. On the other hand, when the actual combustion speed is larger than the target combustion speed during the execution of the fuel injection amount feedback control during the steady operation, for example, the amount of fuel injection is reduced by the fuel injection amount control unit 40d in order to reduce the actual combustion speed to the target combustion speed.

Figure 4:
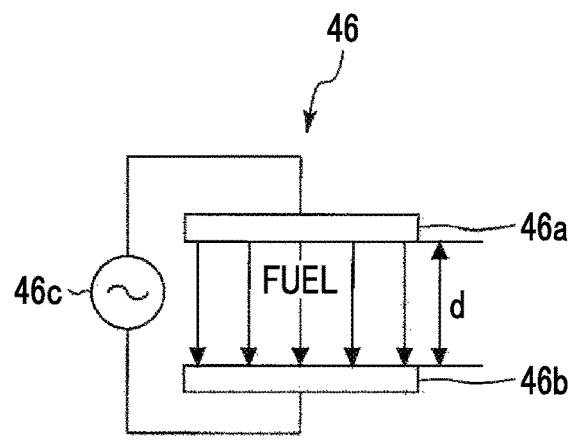
FIG. 4 is a view for explaining a principle of detection by an alcohol concentration sensor 46 in FIG. 1.

As described above, the alcohol concentration sensor 46 is provided in the example illustrated in FIG. 1 to which the control device of the internal combustion engine of the first embodiment is applied. FIG. 4 is a view for explaining a principle of the detection by the alcohol concentration sensor 46 in FIG. 1. As illustrated in FIG. 4, the alcohol concentration sensor 46 are provided with electrodes 46a, 46b and a power source 46c. In an example illustrated in FIGS. 1 and 4 to which the control device of the internal combustion engine of the first embodiment is applied, fuel is arranged between the electrode 46a and the electrode 46b in order for the alcohol concentration sensor 46 to detect the capacitance C of the fuel injected from the fuel injection valve 26 (refer to FIG. 1). Moreover, the capacitance C of the fuel arranged between the electrode 46a and the electrode 46b is calculated, for example, by the ECU (refer to FIG. 1) on the basis of the following Formula 4.

$$C = \varepsilon r \times \varepsilon 0 \times S/d \qquad \text{(Formula 4)}$$

In the above Formula 4, ε represents specific permittivity, 60 represents the permittivity of vacuum, S represents the area of the electrodes 46a, 46b, and d represents a distance between the electrode 46a and the electrode 46b.

Meanwhile, the value of the specific permittivity εrf of fuel (for example, gasoline)in which that neither water nor alcohol (ethanol) is included is set to 2, and the value of the specific permittivity εra of the alcohol (ethanol) is set to 24. For that reason, a value Ca of the capacitance of fuel in which alcohol (ethanol) is included becomes larger than a value Cref (refer to FIG. 6) of the capacitance of the fuel in which neither water no alcohol (ethanol) is included. On the other hand, the value of the specific permittivity εrw of water is 80, and is larger than the value of the specific permittivity εrf of the fuel (for example, gasoline) in which neither water nor alcohol (ethanol) is included. For that reason, a value Cw (refer to FIG. 6) of the capacitance of fuel in which water is included becomes larger than the value Cref of the capacitance of the fuel in which neither water nor alcohol (ethanol) is included, similar to the value Ca of the capacitance of the fuel in which alcohol (ethanol) is included. That is, although the fuel in which neither water nor alcohol is included and the fuel in which water or alcohol is included can be discriminated by using the alcohol concentration sensor 46, the fuel in which water is included, and the fuel in which alcohol is included cannot be precisely discriminated only by using the alcohol concentration sensor 46. In view of this point, in the control device of the internal combustion engine of the first embodiment, fuel injection amount control to be described below is executed in order to precisely determine whether or not water is included in fuel.

Figure 5:
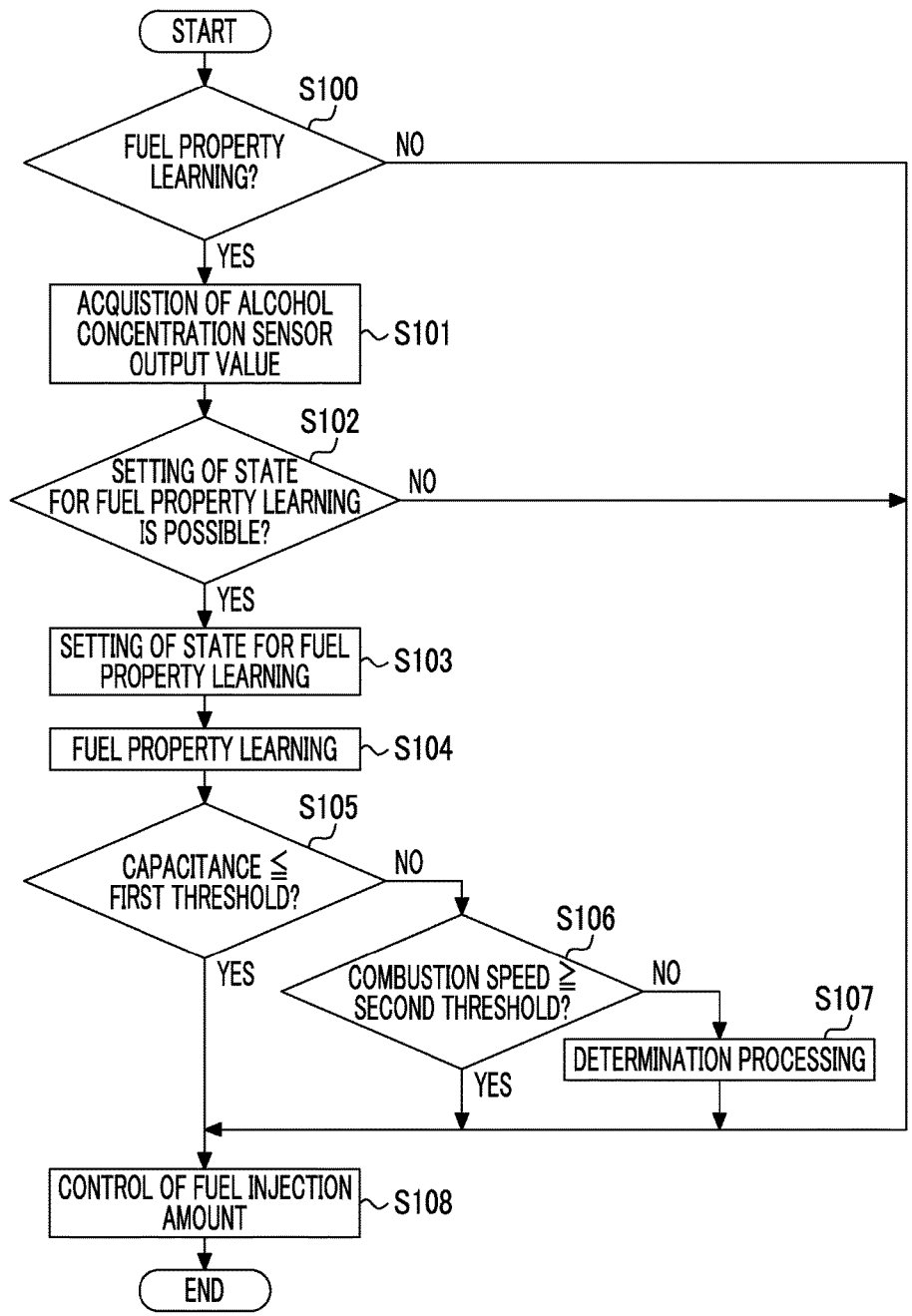
FIG. 5 is a flowchart for explaining fuel injection amount control executed by the control device of the internal combustion engine of the first embodiment.

FIG. 5 is a flowchart for explaining the fuel injection amount control executed by the control device of the internal combustion engine of the first embodiment. In the control device of the internal combustion engine of the first embodiment, processing illustrated in FIG. 5 can be executed, for example, during the operation of the internal combustion engine 10 (refer to FIG. 1). If the processing illustrated in FIG. 5 is started, in Step S100, the ECU 40 (refer to FIGS. 1 and 2), for example, determines whether or not it is necessary to carry out fuel property learning. For example, when fueling is carried out, a possibility that the properties of the fuel injected from the fuel injection valve 26 (refer to FIG. 1) changes is high. In view of this point, in an example illustrated in FIG. 5 to which the control device of the internal combustion engine of the first embodiment is applied, when fueling is carried out, the answer is determined to be YES in Step S100. Additionally, if the stop period of the internal combustion engine 10 becomes long, a possibility that fuel becomes heavy and the properties of the fuel injected from the fuel injection valve 26 changes becomes high. In view of this point, in the example illustrated in FIG. 5 to which the control device of the internal combustion engine of the first embodiment is applied, for example, when a preset period, for which a possibility that the properties of the fuel injected from the fuel injection valve 26 changes becomes high, has elapsed from the previous stop time of the internal combustion engine 10, the answer is determined to be YES in Step S100. When the answer is determined to be YES in Step S100, the processing proceeds to Step S101, and when the answer is determined to be NO in Step S100, the processing proceeds to Step S108. In the example illustrated in FIG. 5 to which the control device of the internal combustion engine of the first embodiment is applied, whether or not the properties of the fuel injected from the fuel injection valve 26 have changed is estimated on the basis of the elapsed period after the time of the previous stop of the internal combustion engine 10. However, in another example to which the control device of the internal combustion engine of the first embodiment is applied, instead, it can also be estimated whether or not the properties of the fuel injected from the fuel injection valve 26 have changed can also be estimated on the basis of the elapsed period after the time of the previous fueling carrying-out.

In Step S101, an output value of the alcohol concentration sensor 46 (refer to FIGS. 1 and 4) is acquired, for example, by the ECU 40 (refer to FIGS. 1 and 2). That is, in Step S101, the capacitance C of the fuel injected from the fuel injection valve 26 (refer to FIG. 1) detected by the alcohol concentration sensor 46 is acquired, for example, by the ECU 40. Next, in Step S102, whether or not setting of the state for fuel property learning is possible is determined, for example, by the ECU 40. That is, in Step S102, in order to calculate the combustion speed parameter showing the combustion speed of the fuel within the cylinder 14' (refer to FIG. 1) on the basis of the in-cylinder pressure P to carry out the fuel property learning, it is determined whether or not the fuel injection amount feedback control can be executed in a state where the air excess ratio is fixed to a preset value as the fuel injection amount feedback control target value. The processing proceeds to Step S103 when the answer is determined to be YES, and proceeds to Step S108 when the answer is determined to be NO. For example, during the transient operation of the internal combustion engine 10 (refer to FIG. 1), in Step S102, the answer is determined to be NO, and the fuel property learning is not carried out.

In Step S103, the setting of the state for fuel property learning is executed, for example, by the fuel property learning unit 40*a* (refer to FIG. 2). That is, in Step S103, in order to calculate the combustion speed parameter showing the combustion speed of the fuel within the cylinder 14' (refer to FIG. 1) on the basis of the in-cylinder pressure P to carry out the fuel property learning, the fuel injection amount feedback control is executed by the fuel injection amount control unit 40*d* (refer to FIG. 2) in a state where the air excess ratio is fixed to a preset value as the fuel injection amount feedback control target value. Next, in Step S104, learning of the properties of the fuel injected from the fuel injection valve 26 (refer to FIG. 1) is carried out by the fuel property learning unit 40*a* in a state where the fuel injection amount feedback control is executed. In detail, in Step S104, the crank angle period (SA-CA10) that is the period until the crank angle (CA10) when the mass fraction burned MFB becomes, for example, 10% is obtained, and the combustion speed parameter (refer to the horizontal axis of FIG. 3) showing the combustion speed of the fuel (that is, the fuel that is a learning target) within the cylinder 14', such as, for example, the maximum value of the heat release rate (dQ/dθ), are calculated on the basis of the in-cylinder pressure P, for example, from the crank angle (SA) equivalent to the ignition timing by the combustion speed parameter calculation unit 40*a*1 (refer to FIG. 2) of the fuel property learning unit 40*a* in a state where the fuel injection amount feedback control is executed. In the example illustrated in FIG. 3, for example, the value CSref of the combustion speed parameter is calculated in Step S104 in a case where neither water nor alcohol is included in the fuel, a value CSw of the combustion speed parameter is calculated in Step S104 in a case where water is included in the fuel, and the value CSa of the combustion speed parameter is calculated in Step S104 in a case where alcohol is included in the fuel. That is, in a case where alcohol is included in the fuel, the combustion speed of fuel becomes large than that in a case where neither water nor alcohol is included in the fuel. On the other hand, the water included in fuel acts as inert gas within the cylinder 14'. Therefore, in a case where water is included in the fuel, the combustion speed of fuel becomes smaller than that in a case where neither water nor alcohol is included in the fuel.

Next, in Step S105, whether or not the capacitance C of the fuel acquired in Step S101 is equal to or lower than a preset first threshold Ct (refer to FIG. 6) is determined by a fuel property determination unit 40*h* (refer to FIG. 2) executed by the ECU 40. The first threshold Ct is a larger value than the value Cref of the capacitance of the fuel in which neither water nor alcohol is included (refer to FIG. 6), and is set to a value smaller than the value Cw (refer to FIG. 6) of the capacitance of the fuel in which water is included. When the capacitance C of the fuel is equal to or lower than the first threshold Ct, the answer is determined to be YES in Step S105, and the processing proceeds to Step S108. On the other hand, when the capacitance C of the fuel is larger than the first threshold Ct, the answer is determined to be NO in Step S105, and the processing proceeds to Step S106. In the example illustrated in FIG. 3, in a case where neither water nor alcohol is included in the fuel and the value CSref of the combustion speed parameter is calculated, the answer is determined to be YES in Step S105. In a case where water is included in the fuel and the value CSw of the combustion speed parameter is calculated, the answer is determined to be NO in Step S105. Additionally, even in a case where alcohol is included in the fuel and the value CSa of the combustion speed parameter is calculated, the answer is determined to be NO in Step S105.

In Step S106, whether or not the combustion speed, within the cylinder 14', (refer to FIG. 1) of the fuel that is the learning target that the combustion speed parameter calculated by the combustion speed parameter calculation unit 40a1 (refer to FIG. 2) executed by the ECU 40 in Step S104 shows is equal to or more than a preset second threshold is determined by the fuel property determination unit 40h. The second threshold is a larger value than the combustion speed, within the cylinder 14', of the fuel in which water is included, is a value smaller than the combustion speed, within the cylinder 14', of the fuel in which the fuel in which the alcohol is included, and is set to, for example, a value approximately equal to the combustion speed, within the cylinder 14', of the fuel in which neither water nor alcohol is included. When the combustion speed, within the cylinder 14', of the fuel that is the learning target is equal to or more than the second threshold, the answer is determined to be YES in Step S106, that is, it is determined by the fuel property determination unit 40h that water is not included in the fuel that is the learning target, and the processing proceeds to Step S108. On the other hand, when the combustion speed, within the cylinder 14', of the fuel that is the learning target is smaller than the second threshold, the answer is determined to be NO in Step S106, that is, it is determined by the fuel property determination unit 40h that water is included in the fuel that is the learning target, and the processing proceeds to Step S107. In the example illustrated in FIG. 3, in a case where water is included in the fuel and the value CSw of the combustion speed parameter is calculated, the answer is determined to be NO in Step S106. On the other hand, in a case where alcohol is included in the fuel and the value CSa of the combustion speed parameter is calculated, the answer is determined to be YES in Step S106.

In Step S107, determination processing to the effect that water is included in the fuel that is the learning target is executed, for example, by the ECU (refer to FIGS. 1 and 2), and the processing proceeds to Step S108. Specifically, in the example illustrated in FIGS. 1 and 5 to which the control device of the internal combustion engine of the first embodiment is applied, in Step S107, a reporting device 48 (refer to FIG. 1) reporting an abnormality is made to operate, for example, by the ECU 40 (refer to FIGS. 1 and 2). When the reporting device 48 is made to operate in Step S107, a driver can ascertain that water is included in the fuel.

In Step S108, the fuel injection amount control is executed by the fuel injection amount control unit 40d (refer to FIG. 2). In detail, during the transient operation of the internal combustion engine 10 (refer to FIG. 1), in Step S108, for example, the fuel injection amount feedforward control of using the combustion limit air excess ratio (refer to the vertical axis of FIG. 3), which is obtained from the value of the combustion speed parameter (refer to the horizontal axis of FIG. 3) showing the combustion speed of the fuel within the cylinder 14' (refer to FIG. 1) calculated in Step S104 and the first relationship illustrated by the straight line L1 in FIG. 3, as the fuel injection amount feedforward control target value, is executed by the fuel injection amount control unit 40d.

Specifically, in the example illustrated in FIG. 3, in a case where the value CSref (refer to FIG. 3) of the combustion speed parameter showing the combustion speed of the fuel within the cylinder 14' (refer to FIG. 1) is calculated in Step S104, the answer is determined to be YES in Step S105 as described above. Next, in Step S108, during the transient operation of the internal combustion engine 10 (refer to FIG. 1), the fuel injection amount feedforward control of using the combustion limit air excess ratio εref (refer to FIG. 3) corresponding to the value CSref of the combustion speed parameter as the fuel injection amount feedforward control target value is executed by the fuel injection amount control unit 40d (refer to FIG. 2). Additionally, in the example illustrated in FIG. 3, in a case where the value CSa (refer to FIG. 3) of the combustion speed parameter showing the combustion speed of the fuel within the cylinder 14' is calculated in Step S104, the answer is determined to be NO in Step S105 as described above. Next, the answer is determined to be YES in Step S106 as described above. Next, in Step S108, during the transient operation of the internal combustion engine 10, the fuel injection amount feedforward control of using the combustion limit air excess ratio λ a (refer to FIG. 3) corresponding to the value CSa of the combustion speed parameter as the fuel injection amount feedforward control target value is executed by the fuel injection amount control unit 40d. Otherwise, in the example illustrated in FIG. 3, in a case where the value CSW (refer to FIG. 3) of the combustion speed parameter showing the combustion speed of the fuel within the cylinder 14' is calculated in Step S104, the answer is determined to be NO in Step S105 as described above. Next, the answer is determined to be NO in Step S106 as described above. Next, Step S107 is executed as described above. Next, in Step S108, during the transient operation of the internal combustion engine 10, the fuel injection amount feedforward control of using the combustion limit air excess ratio λ w (refer to FIG. 3) corresponding to the value CSW of the combustion speed parameter as the fuel injection amount feedforward control target value is executed by the fuel injection amount control unit 40d.

In detail, during the steady operation of the internal combustion engine 10 (refer to FIG. 1), in Step S108, for example, the fuel injection amount feedback control of using the combustion limit combustion speed parameter (refer to the vertical axis of FIG. 3), which is obtained from the value of the combustion speed parameter (refer to the horizontal axis of FIG. 3) showing the combustion speed of the fuel within the cylinder 14' (refer to FIG. 1) calculated in Step S104 and the second relationship illustrated by the straight line L2 in FIG. 3, as the fuel injection amount feedback control target value, is executed by the fuel injection amount control unit 40d (refer to FIG. 2).

Specifically, in the example illustrated in FIG. 3, in a case where the value CSref (refer to FIG. 3) of the combustion speed parameter showing the combustion speed of the fuel within the cylinder 14' (refer to FIG. 1) is calculated in Step S104, the answer is determined to be YES in Step S105 as described above. Next, in Step S108, during the steady operation of the internal combustion engine 10 (refer to FIG. 1), the fuel injection amount feedback control of using the value CSref (refer to FIG. 3) of the combustion limit combustion speed parameter corresponding to the value CSref of the combustion speed parameter as the fuel injection amount feedback control target value is executed by the fuel injection amount control unit 40d (refer to FIG. 2). Additionally, in the example illustrated in FIG. 3, in a case where the value CSa (refer to FIG. 3) of the combustion speed parameter showing the combustion speed of the fuel within the cylinder 14' is calculated in Step S104, the answer is determined to be NO in Step S105 as described above. Next, the answer is determined to be YES in Step S106 as described above. Next, in Step S108, during the steady operation of the internal combustion engine 10, the fuel injection amount feedback control of using the value CSa' (refer to FIG. 3) of the combustion limit combustion speed parameter corresponding to the value CSa of the combustion speed parameter as the fuel injection amount feedback control target value is executed by the fuel injection amount control unit 40d. Otherwise, in the example illustrated in FIG. 3, in a case where the value CSW (refer to FIG. 3) of the combustion speed parameter showing the combustion speed of the fuel within the cylinder 14' is calculated in Step S104, the answer is determined to be NO in Step S105 as described above. Next, the answer is determined to be NO in Step S106 as described above. Next, Step S107 is executed as described above. Next, in Step S108, during the steady operation of the internal combustion engine 10, the fuel injection amount feedback control of using the value CSw' (refer to FIG. 3) of the combustion limit combustion speed parameter corresponding to the value CSW of the combustion speed parameter as the fuel injection amount feedback control target value is executed by the fuel injection amount control unit 40d.

Figure 6:
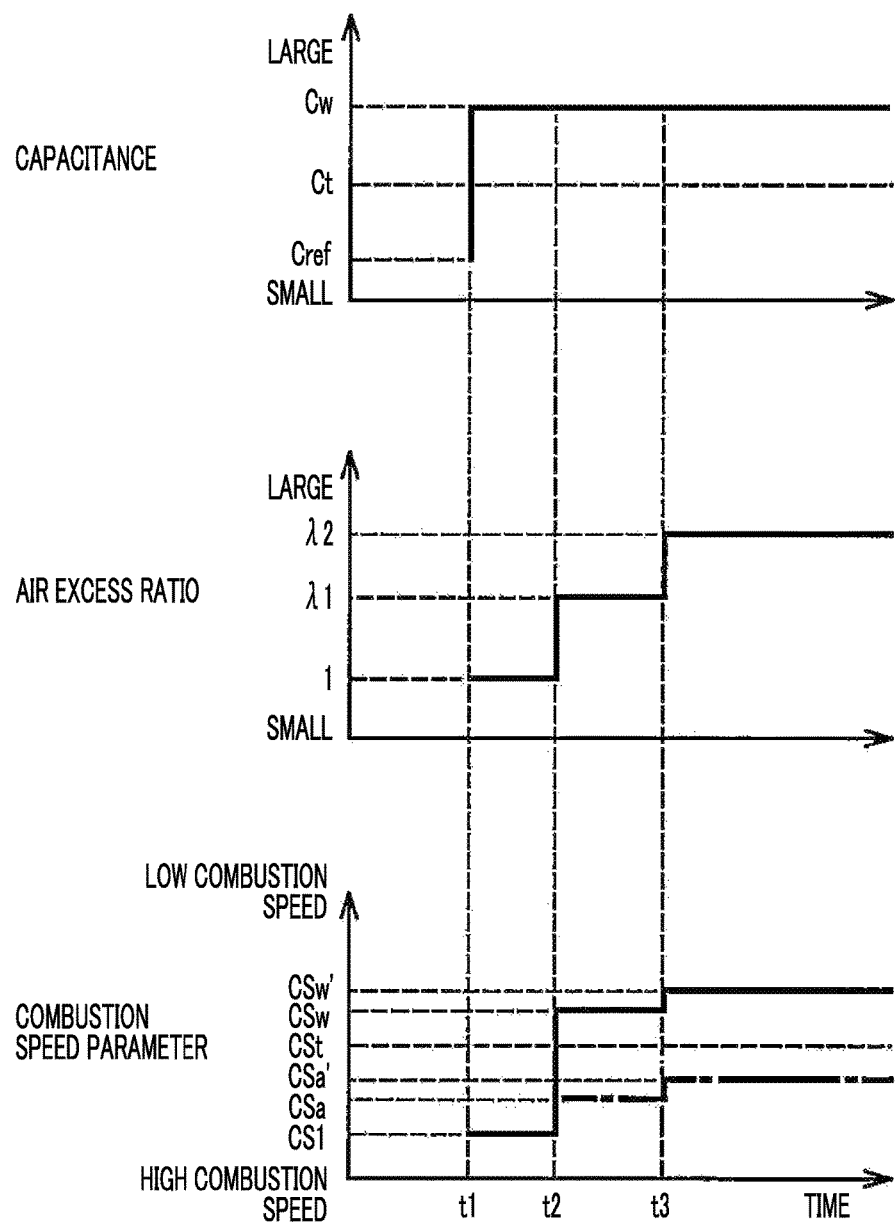
FIG. 6 is a time chart of capacitance or the like detected by the alcohol concentration sensor 46 when processing illustrated in FIG. 5 is executed by the control device of the internal combustion engine of the first embodiment.

FIG. 6 is a time chart of the capacitance or the like detected by the alcohol concentration sensor 46 (refer to FIG. 1) when the processing illustrated in FIG. 5 is executed by the control device of the internal combustion engine of the first embodiment. Sequentially, the values of the capacitance, the air excess ratio, and the combustion speed parameter is illustrated from the top of the FIG. 6. In an example illustrated in FIG. 6 to which the control device of the internal combustion engine of the first embodiment is applied, fueling is carried out at a time t1, the internal combustion engine 10 (refer to FIG. 1) is started up, and the processing illustrated in FIG. 5 is started. In detail, in the example illustrated in FIG. 6 to which the control device of the internal combustion engine of the first embodiment is applied, neither water nor alcohol is included in the fuel injected from the fuel injection valve 26 (refer to FIG. 1) before the time t1. Water is included in the fuel fueled at the time t1. For that reason, as illustrated in FIG. 6, the capacitance detected by the alcohol concentration sensor 46 (refer to FIG. 1) at the time t1 increases from the value Cref to the value Cw larger than the first threshold Ct.

In the example illustrated in FIG. 6 to which the control device of the internal combustion engine of the first embodiment is applied, Step S100, S102, and S101 of FIG. 5 are executed in a period t1-t2. In detail, in the period t1-t2, the answer is determined to be YES in Step S100, the value Cw (refer to FIG. 6) of the capacitance is detected by the alcohol concentration sensor 46 (refer to FIG. 1) and the output value of the alcohol concentration sensor 46 is acquired, for example, by the ECU 40 (refer to FIGS. 1 and 2), in Step S101, and the answer is determined to be YES in Step S102. In the example illustrated in FIG. 6 to which the control device of the internal combustion engine of the first embodiment is applied, in the period t1-t2 for which Step S100, S101, and S102 of FIG. 5 are executed, the fuel injection amount feedback control of using, for example, a value 1 (that is, the theoretical air-fuel ratio) of the air excess ratio (refer to FIG. 6) as the fuel injection amount feedback control target value is executed, for example, by the fuel injection amount control unit 40d (refer to FIG. 2). Additionally, the value of the combustion speed parameter (refer to FIG. 6) becomes CS1 in the period t1-t2 for which Step S100, S101, and S102 of FIG. 5 are executed.

In the example illustrated in FIG. 6 to which the control device of the internal combustion engine of the first embodiment is applied, next, Step S103, S104, S105, S106, and S107 of FIG. 5 are executed in a period t2-t3. In detail, in the period t2-t3, Step S103 is executed, the fuel injection amount feedback control of using a value λ1 (refer to FIG. 6) of, for example, the air excess ratio serving as a state for fuel property learning as the fuel injection amount feedback control target value is executed, for example, by the fuel injection amount control unit 40d (refer to FIG. 2), and the fuel property learning is executed in Step S104. This value λ1 is larger than the value 1 (that is, the theoretical air-fuel ratio), and is set to a value smaller than a value λ w (refer to FIG. 3) of the combustion limit air excess ratio. Additionally, in the period t2-t3, the combustion speed that the value CSw (refer to FIGS. 3 and 6) of the combustion speed parameter calculated in Step S104 shows is smaller than the combustion speed that a value CS1 (refer to FIG. 6) of the combustion speed parameter shows. In detail, in the example illustrated in FIG. 6 to which the control device of the internal combustion engine of the first embodiment is applied, in the period t2-t3, the value Cw (refer to FIG. 6) of the capacitance is larger than the first threshold Ct (refer to FIG. 6). Therefore, the answer is determined to be NO in Step S105. Additionally, in the period t2-t3, the combustion speed that the value CSw (refer to FIG. 6) of the combustion speed parameter shows is smaller than the second threshold that a value CSt (refer to FIG. 6) of the combustion speed parameter shows. Therefore, the answer is determined to be NO in Step S106, and Step S107 is executed.

In the example illustrated in FIG. 6 to which the control device of the internal combustion engine of the first embodiment is applied, next, Step S108 of FIG. 5 is executed after a time t3. In detail, for example, idling operation of the internal combustion engine 10 (refer to FIG. 1) is executed after the time t3. That is, in the example illustrated in FIG. 6 to which the control device of the internal combustion engine of the first embodiment is applied, the fuel injection amount feedback control is executed by the fuel injection amount control unit 40d (refer to FIG. 2) in Step S108 after the time t3. In detail, in the example illustrated in FIG. 6 to which the control device of the internal combustion engine of the first embodiment is applied, the fuel injection amount feedback control of using the value CSw (refer to FIGS. 3 and 6) of the combustion speed parameter calculated in Step S104 and the value CSw' (refer to FIGS. 3 and 6) of the combustion limit combustion speed parameter obtained from the second relationship illustrated by the straight line L2 in FIG. 3 as fuel injection amount feedback control target values is executed by the fuel injection amount control unit 40d in Step S108.

In a case where not water but alcohol is temporarily included in the fuel fueled at the time t1 of FIG. 6, as illustrated by a one-dot chain, in the period t2-t3, the fuel injection amount feedback control of using the value λ1 of the air excess ratio as the fuel injection amount feedback control target value is executed, and the value CSa (refer to FIGS. 3 and 6) of the combustion speed parameter is calculated in Step S104 of FIG. 5. Next, after the period t3, the fuel injection amount feedback control of using the value CSa (refer to FIGS. 3 and 6) of the combustion speed parameter and the value CSa' (refer to FIGS. 3 and 6) of the combustion limit combustion speed parameter obtained from the second relationship illustrated by the straight line L2 in FIG. 3 as fuel injection amount feedback control target values is executed by the fuel injection amount control unit 40d (refer to FIG. 2) in Step S108 of FIG. 5.

As described above, in the example illustrated in FIG. 5 to which the control device of the internal combustion engine of the first embodiment is applied, when the capacitance of fuel is larger than the preset first threshold Ct (refer to FIG. 6), that is, when a possibility that water is included in the fuel and a possibility that alcohol is included in the fuel are present and it cannot be discriminated whether water is included in the fuel or alcohol is included in the fuel, the answer is determined to be NO in Step S105, and the combustion speed, within the cylinder 14' (refer to FIG. 1), of the fuel that the combustion speed parameter calculated on the basis of the in-cylinder pressure P shows and the preset second threshold are compared with each other in Step S106. Moreover, in the example illustrated in FIG. 5 to which the control device of the internal combustion engine of the first embodiment is applied, when the combustion speed of the fuel within the cylinder 14' is smaller than the second threshold, in Step S106, the answer is determined to be NO and water is determined to be included in the fuel. For that reason, in the example illustrated in FIG. 5 to which the control device of the internal combustion engine of the first embodiment is applied, it can be precisely determined that water is included in the fuel. That is, in the example illustrated in FIG. 5 to which the control device of the internal combustion engine of the first embodiment is applied, a concern that it is erroneously determined that alcohol is included in the fuel irrespective of whether water is included in the fuel can be suppressed.

As described above, in the example illustrated in FIG. 5 to which the control device of the internal combustion engine of the first embodiment is applied, in Step S108 after Step S107 is executed, the fuel injection amount feedforward control of using the combustion limit air excess ratio λ w (refer to FIG. 3) as the fuel injection amount feedforward control target value, the fuel injection amount feedback control of using the value CSw' (refer to FIG. 3) of the combustion limit combustion speed parameter as the fuel injection amount feedback control target value, that is, the fuel injection amount control for executing the lean burn operation is executed. However, in another example to which the control device of the internal combustion engine of the first embodiment is applied, instead, the lean burn operation is not executed but, for example, a stoichmetric combustion operation can also be executed after Step S107 is executed. Additionally, as described above, in the example illustrated in FIG. 5 to which the control device of the internal combustion engine of the first embodiment is applied, the reporting device 48 (refer to FIG. 1) is made to operate as the determination processing to the effect that water is included in the fuel, which is executed in Step S107. However, in another example to which the control device of the internal combustion engine of the first embodiment is applied, in a case where a normal operation is continuable, for example, even if water is included in the fuel by changing a fuel injection amount control target value, the reporting device 48 may not be operated in Step S107. In this case, instead, for example, the processing of setting a flag to the effect that water is included in the fuel may be executed in Step S107.

In the example illustrated in FIG. 5 to which the control device of the internal combustion engine of the first embodiment is applied, in Step S108, the combustion limit air excess ratio obtained from the first relationship illustrated by the straight line L1 in FIG. 3 is used as the fuel injection amount feedforward control target value during the transient operation, and the value of the combustion limit combustion speed parameter obtained from the second relationship illustrated by the straight line L2 in FIG. 3 is used as the fuel injection amount feedback control target value during the steady operation. However, in another example to which the control device of the internal combustion engine of the first embodiment is applied, instead, in Step S108, a value different from the combustion limit air excess ratio obtained from the first relationship illustrated by the straight line L1 in FIG. 3 is used as the fuel injection amount feedforward control target value during the transient operation, or a value different from the value of the combustion limit combustion speed parameter obtained from the second relationship illustrated by the straight line L2 in FIG. 3 can also be used as the fuel injection amount feedback control target value during the steady operation.

Moreover, in the example illustrated in FIG. 1 to which the control device of the internal combustion engine of the first embodiment is applied, an EGR operation for improving emission can be executed. In detail, in the control device of the internal combustion engine of the first embodiment, the EGR valve control to be described below can also be executed instead of the above-described fuel injection amount control in order to precisely determine whether or not water is included in the fuel.

In the example illustrated in FIG. 2 to which the control device of the internal combustion engine of the first embodiment is applied, an EGR valve control unit 40g that control the opening degree of the EGR valve 38 (refer to FIG. 1) is executed by the ECU 40. In detail, in the example illustrated in FIG. 2 to which the control device of the internal combustion engine of the first embodiment is applied, in a case where the EGR operation is executed, EGR valve feedforward control is executed by the EGR valve control unit 40g during the transient operation of the internal combustion engine 10 (refer to FIG. 1). During the transient operation of the internal combustion engine 10, a combustion limit EGR rate calculated by an combustion limit EGR rate calculation unit 40e executed by the ECU 40 is used as a target value of the EGR valve feedforward control. The combustion limit EGR rate represents an EGR rate (that is, an EGR rate set to as large value as possible within a range where combustion does not deteriorate) corresponding to the combustion limit. That is, during the transient operation of the internal combustion engine 10, the EGR valve feedforward control based on the combustion limit EGR rate is executed by the EGR valve control unit 40g. Moreover, in the example illustrated in FIG. 2 to which the control device of the internal combustion engine of the first embodiment is applied, in a case where the EGR operation is executed, EGR valve feedback control is executed by the EGR valve control unit 40g during the steady operation of the internal combustion engine 10. During the steady operation of the internal combustion engine 10, a combustion limit combustion speed parameter calculated by a second combustion limit combustion speed parameter calculation unit 40f executed by the ECU 40 is used as a target value of the EGR valve feedback control. The combustion limit combustion speed parameter shows a combustion speed (that is, the combustion speed of fuel in a state where the EGR rate is set to as large value as possible within a range where combustion does not deteriorate) of the fuel within the cylinder 14' (refer to FIG. 1) corresponding to a combustion limit. That is, during the steady operation of the internal combustion engine 10, the EGR valve feedback control based on the combustion limit combustion speed parameter is executed by the EGR valve control unit 40g.

Figure 7:
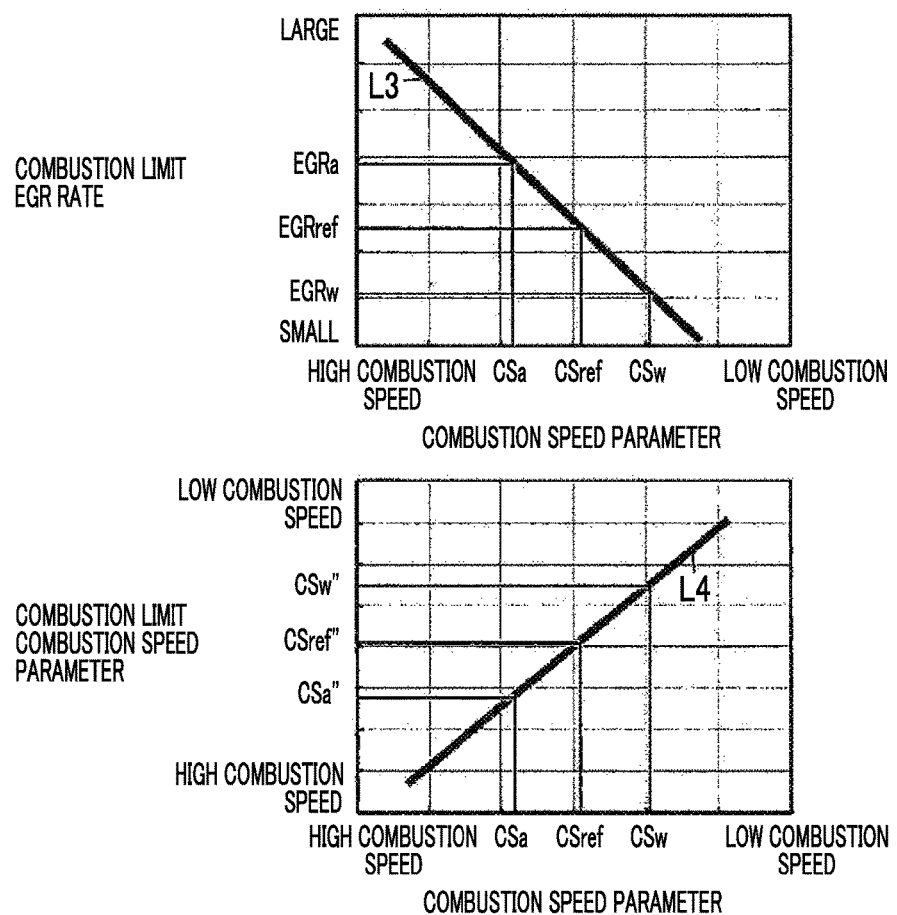
FIG. 7 is a view illustrating a relationship between the combustion speed parameter and a combustion limit EGR rate, and the like, which are applied to the control device of the internal combustion engine of the first embodiment.

FIG. 7 is a view illustrating a relationship between the combustion speed parameter and the combustion limit EGR rate, and the like, which are applied the control device of the internal combustion engine of the first embodiment. In detail, an upper view of FIG. 7 illustrates the relationship between the combustion speed parameter and the combustion limit EGR rate, which is applied to the control device of the internal combustion engine of the first embodiment, and a lower view of FIG. 7 illustrates a relationship between the combustion speed parameter and the combustion limit combustion speed parameter, which is applied to the control device of the internal combustion engine of the first embodiment. In an example illustrated in FIG. 7 to which the control device of the internal combustion engine of the first embodiment is applied, as illustrated by a straight line L3, the value of the combustion limit EGR rate that should be an EGR valve feedback control target value during the transient operation becomes larger as the combustion speed of the fuel within the cylinder 14' (refer to FIG. 1) becomes larger.

In detail, in the control device of the internal combustion engine of the first embodiment, as illustrated in FIG. 7, when the combustion speed parameter showing the combustion speed of the fuel within the cylinder 14' (refer to FIG. 1) changes, for example, from a value CSa to a value CSref with a change in the properties of the fuel injected from the fuel injection valve 26 (refer to FIG. 1), the combustion limit EGR rate that is an EGR valve feedforward control target value during the transient operation is changed from a value EGRa to a value EGRref by the combustion limit EGR rate calculation unit 40e (refer to FIG. 2) on the basis of a third relationship illustrated by the straight line L3. For that reason, in the control device of the internal combustion engine of the first embodiment, as a change in the combustion limit EGR rate that is the fuel EGR valve feedforward control target value during the transient operation is maintained at the value EGRa when the combustion speed parameter changes from the value CSa to the value CSref with the change in the properties of the fuel injected from the fuel injection valve 26, a concern that combustion may deteriorate during an EGR transient operation can be suppressed.

Additionally, in the control device of the internal combustion engine of the first embodiment, as illustrated in FIG. 7, when the combustion speed parameter showing the combustion speed of the fuel within the cylinder 14' (refer to FIG. 1) changes, for example, from the value CSref to the value CSa with a change in the properties of the fuel injected from the fuel injection valve 26 (refer to FIG. 1), the combustion limit EGR rate that is an EGR valve feedforward control target value during the transient operation is changed from the value EGRref to the value EGRa by the combustion limit EGR rate calculation unit 40e (refer to FIG. 2) on the basis of a third relationship illustrated by the straight line L3. For that reason, in the control device of the internal combustion engine of the first embodiment, as a change in the combustion limit EGR rate that is the fuel EGR valve feedforward control target value during the transient operation is maintained at the value EGRref when the combustion speed parameter changes from the value CSref to the value CSa with the change in the properties of the fuel injected from the fuel injection valve 26, a concern that emission may deteriorate during an EGR transient operation can be suppressed. In the example illustrated in FIG. 2 to which the control device of the internal combustion engine of the first embodiment is applied, the third relationship illustrated by the straight line L3 (refer to FIG. 7) is obtained in advance, for example, by experiment or the like, and is stored, for example, in a storage unit 40e1 of the combustion limit EGR rate calculation unit 40e. In an example illustrated in FIG. 7 to which the control device of the internal combustion engine of the first embodiment is applied, for example, the approximated straight line L3 is used as a line showing that the third relationship in which the combustion limit EGR rate becomes larger as the combustion speed of the fuel within the cylinder 14' becomes larger. However, in another example to which the control device of the internal combustion engine of the first embodiment is applied, for example, an arbitrary line other than the straight line, such as a map, can also be used as the line showing the third relationship in which the combustion limit EGR rate becomes larger as the combustion speed of the fuel within the cylinder 14' becomes larger.

In the example illustrated in FIG. 2 to which the control device of the internal combustion engine of the first embodiment is applied, when a current EGR rate is smaller than the combustion limit EGR rate that is the EGR valve feedforward control target value during the transient operation during the execution of the EGR valve feedforward control during the transient operation, the opening degree of the EGR valve 38 (refer to FIG. 1) is increased, for example, by the EGR valve control unit 40g such that the current EGR rate increases up to the target value. On the other hand, when the current EGR rate is larger than target value during the execution of the EGR valve feedforward control during the transient operation, the opening degree of the EGR valve 38 is reduced such that the current EGR rate is reduced up to the target value by the EGR valve control unit 40g.

In the example illustrated in FIG. 2 to which the control device of the internal combustion engine of the first embodiment is applied, the current EGR rate can be calculated, for example, by a technique described in from Paragraph 0165 to Paragraph 0167 of Japanese Patent Application Publication No. 2001-164999 (JP 2001-164999 A). In detail, in this example, the EGR rate is calculated, for example, on the basis of the total amount (the total of the amount of new air and the amount of EGR gas that are sucked into the internal combustion engine 10) of intake air sucked into the internal combustion engine 10 (refer to FIG. 1), and the amount of new air detected by the air flow meter 44 (refer to FIG. 1). Specifically, the total amount of the intake air sucked into the internal combustion engine 10 is calculated, for example, by integrating an intake air pressure detected by a pressure sensor (not illustrated) arranged in the intake passage 16 (refer to FIG. 1) and the unique intake pipe base charging efficiency of the internal combustion engine 10. The intake pipe base charging efficiency is expressed as a function of then engine rotation speed, or is obtained in advance, for example, by experiment or the like.

In another example to which the control device of the internal combustion engine of the first embodiment is applied, instead, the current EGR rate can also be calculated, for example, by a technique described in Paragraph 0029 of Japanese Patent No. 5601232, using the in-cylinder pressure P detected by the in-cylinder pressure sensor 30 (refer to FIG. 1).

Moreover, in the example illustrated in FIG. 7 to which the control device of the internal combustion engine of the first embodiment is applied, as illustrated by a straight line L4, the combustion speed (refer to a horizontal axis of FIG. 7) of the fuel within the cylinder 14' at the time of the combustion limit (in detail, when the EGR rate is made to be large up to the combustion limit) becomes larger as the combustion speed (refer to a vertical axis of FIG. 7) of fuel within the cylinder 14' (refer to FIG. 1) at the time of a non-combustion limit becomes larger.

In detail, in the control device of the internal combustion engine of the first embodiment, as illustrated in FIG. 7, when the combustion speed parameter (refer to the horizontal axis of FIG. 7) showing the combustion speed of the fuel within the cylinder 14' (refer to FIG. 1) changes, for example, from the value CSa to the value CSref with a change in the properties of the fuel injected from the fuel injection valve 26 (refer to FIG. 1), the combustion limit combustion speed parameter (refer to the vertical axis of FIG. 7) showing the combustion speed of the fuel within the cylinder 14' corresponding to the combustion limit (in detail, the combustion limit caused by the EGR rate large) that is the EGR valve feedback control target value during the steady operation is changed from a value CSa" to a value CSref" on the basis of a fourth relationship illustrated by the straight line L4, for example, by the second combustion limit combustion speed parameter calculation unit 40f (refer to FIG. 2). For that reason, in the control device of the internal combustion engine of the first embodiment, as the combustion limit combustion speed parameter (refer to the vertical axis of FIG. 7) that is the EGR valve feedback control target value during the steady operation is maintained at the value CSa" when the combustion speed parameter (refer to the horizontal axis of FIG. 7) changes, for example, from the value CSa to the value CSref with a change in the properties of the fuel injected from the fuel injection valve 26, a concern that combustion may deteriorate during a EGR steady operation can be suppressed.

Additionally, in the control device of the internal combustion engine of the first embodiment, as illustrated in FIG. 7, when the combustion speed parameter (refer to the horizontal axis of FIG. 7) showing the combustion speed of the fuel within the cylinder 14' (refer to FIG. 1) changes from the value CSref to the value CSa with a change in the properties of the fuel injected from the fuel injection valve 26 (refer to FIG. 1), the combustion limit combustion speed parameter (refer to the vertical axis of FIG. 7) that is the EGR valve feedback control target value during the steady operation is changed from the value CSref" to the value CSa", for example, by the second combustion limit combustion speed parameter calculation unit 40f (refer to FIG. 2), on the basis of the fourth relationship illustrated by the straight line L4. For that reason, in the control device of the internal combustion engine of the first embodiment, as the combustion limit combustion speed parameter (refer to the vertical axis of FIG. 7) that is the EGR valve feedback control target value during the steady operation is maintained at the value CSref" when the combustion speed parameter (refer to the horizontal axis of FIG. 7) changes, for example, from the value CSref to the value CSa with a change in the properties of the fuel injected from the fuel injection valve 26, a concern that combustion may deteriorate during the EGR steady operation can be suppressed. In the example illustrated in FIG. 2 to which the control device of the internal combustion engine of the first embodiment is applied, the fourth relationship illustrated by the straight line L4 (refer to FIG. 7) is obtained in advance, for example, by experiment or the like, and is stored, for example, in a storage unit 40f1 of the second combustion limit combustion speed parameter calculation unit 40f. In the example illustrated in FIG. 7 to which the control device of the internal combustion engine of the first embodiment is applied, for example, the approximated straight line L4 is used as a line showing the fourth relationship in which the combustion speed of the fuel within the cylinder 14' corresponding to the combustion limit becomes larger as the combustion speed of fuel within the cylinder 14' becomes larger. However, in another example to which the control device of the internal combustion engine of the first embodiment is applied, for example, an arbitrary line other than the straight line, such as a map, can also be used as a line showing the fourth relationship in which the combustion speed of the fuel within the cylinder 14' corresponding to the combustion limit becomes larger as the combustion speed of fuel within the cylinder 14' becomes larger.

In the example illustrated in FIG. 2 to which the control device of the internal combustion engine of the first embodiment is applied, when an actual combustion speed corresponding to the combustion speed parameter calculated by the combustion speed parameter calculation unit 40a1 during the execution of the EGR valve feedback control during the steady operation is smaller than a target combustion speed corresponding to the combustion limit combustion speed parameter that is the EGR valve feedback control target value during the steady operation, for example, the opening degree of the EGR valve 38 (refer to FIG. 1) is reduced by the EGR valve control unit 40g in order to increase the actual combustion speed up to the target combustion speed. On the other hand, when the actual combustion speed is larger than the target combustion speed during the execution of the EGR valve feedback control during the steady operation, for example, the opening degree of EGR valve 38 is increased by the EGR valve control unit 40g in order to reduce the actual combustion speed to the target combustion speed.

FIG. 8 is a flowchart for explaining the EGR valve control executed by the control device of the internal combustion engine of the first embodiment. In the control device of the internal combustion engine of the first embodiment, processing illustrated in FIG. 8 can be executed, for example, during the operation of the internal combustion engine 10 (refer to FIG. 1). If the processing illustrated in FIG. 8 is started, in Step S200, the ECU 40 (refer to FIGS. 1 and 2), for example, determines whether or not it is necessary to carry out fuel property learning. For example, when fueling is carried out, a possibility that the properties of the fuel injected from the fuel injection valve 26 (refer to FIG. 1) changes is high. In view of this point, in an example illustrated in FIG. 8 to which the control device of the internal combustion engine of the first embodiment is applied, when fueling is carried out, the answer is determined to be YES in Step S200. Additionally, if the stop period of the internal combustion engine 10 becomes long, a possibility that fuel becomes heavy and the properties of the fuel injected from the fuel injection valve 26 changes becomes high. In view of this point, in the example illustrated in FIG. 8 to which the control device of the internal combustion engine of the first embodiment is applied, for example, when a preset period, for which a possibility that the properties of the fuel injected from the fuel injection valve 26 changes becomes high, has elapsed from the previous stop time of the internal combustion engine's 10, the answer is determined to be YES in Step S200. When the answer is determined to be YES in Step S200, the processing proceeds to Step S101, and when the answer is determined to be NO in Step S200, the processing proceeds to Step S208. In the example illustrated in FIG. 8 to which the control device of the internal combustion engine of the first embodiment is applied, whether or not the properties of the fuel injected from the fuel injection valve 26 have changed is estimated on the basis of the elapsed period after the time of the previous stop of the internal combustion engine 10. However, in another example to which the control device of the internal combustion engine of the first embodiment is applied, instead, it can also be estimated whether or not the properties of the fuel injected from the fuel injection valve 26 have changed can also be estimated on the basis of the elapsed period after the time of the previous fueling carrying-out.

In Step S101, the same processing as that in Step S101 of FIG. 5 is executed. Next, in Step S202, whether or not setting of the state for fuel property learning is possible is determined, for example, by the ECU 40 (refer to FIGS. 1 and 2). That is, in Step S202, in order to calculate the combustion speed parameter showing the combustion speed of the fuel within the cylinder 14' (refer to FIG. 1) on the basis of the in-cylinder pressure P to carry out the fuel property learning, it is determined whether or not the EGR valve feedback control can be executed in a state where the EGR rate is fixed to a preset value larger than zero as the EGR valve feedback control target value. The processing proceeds to Step S203 when the answer is determined to be YES, and proceeds to Step S208 when the answer is determined to be NO. For example, during the transient operation of the internal combustion engine 10 (refer to FIG. 1), in Step S202, the answer is determined to be NO, and the fuel property learning is not carried out.

In Step S203, the setting of the state for fuel property learning is executed, for example, by the fuel property learning unit 40a (refer to FIG. 2). That is, in Step S203, in order to calculate the combustion speed parameter showing the combustion speed of the fuel within the cylinder 14' (refer to FIG. 1) on the basis of the in-cylinder pressure P to carry out the fuel property learning, the EGR valve feedback control is executed by the EGR valve control unit 40g (refer to FIG. 2) in a state where the EGR rate is fixed to a preset value larger than zero as the EGR valve feedback control target value. Next, in Step S204, learning of the properties of the fuel injected from the fuel injection valve 26 (refer to FIG. 1) is carried out by the fuel property learning unit 40a in a state where the EGR valve feedback control is executed. In detail, in Step S204, the crank angle period (SA-CA10) that is the period until the crank angle (CA10) when the mass fraction burned MFB becomes, for example, 10% is obtained, and the combustion speed parameter (refer to the horizontal axis of FIG. 7) showing the combustion speed of the fuel (that is, the fuel that is a learning target) within the cylinder 14', such as, for example, the maximum value of the heat release rate (dQ/dθ), are calculated on the basis of the in-cylinder pressure P, for example, from the crank angle (SA) equivalent to the ignition timing by the combustion speed parameter calculation unit 40a1 (refer to FIG. 2) of the fuel property learning unit 40a in a state where the EGR valve feedback control is executed. In the example illustrated in FIG. 7, for example, the value CSref of the combustion speed parameter is calculated in Step S204 in a case where neither water nor alcohol is included in the fuel, a value CSw of the combustion speed parameter is calculated in Step S204 in a case where water is included in the fuel, and the value CSa of the combustion speed parameter is calculated in Step S204 in a case where alcohol is included in the fuel. That is, in a case where alcohol is included in the fuel, the combustion speed of fuel becomes large than that in a case where neither water nor alcohol is included in the fuel. On the other hand, the water included in fuel acts as inert gas within the cylinder 14'. Therefore, in a case where water is included in the fuel, the combustion speed of fuel becomes smaller than that in a case where neither water nor alcohol is included in the fuel.

Next, in Step S105, the same processing as that in Step S105 of FIG. 5 is executed. When the capacitance C of the fuel is equal to or lower than the first threshold Ct (refer to FIG. 6), the answer is determined to be YES in Step S105, and the processing proceeds to Step S208. On the other hand, when the capacitance C of the fuel is larger than the first threshold Ct, the answer is determined to be NO in Step S105, and the processing proceeds to Step S106. In the example illustrated in FIG. 7, in a case where neither water nor alcohol is included in the fuel and the value CSref of the combustion speed parameter is calculated, the answer is determined to be YES in Step S105. In a case where water is included in the fuel and the value CSw of the combustion speed parameter is calculated, the answer is determined to be NO in Step S105. Additionally, even in a case where alcohol is included in the fuel and the value CSa of the combustion speed parameter is calculated, the answer is determined to be NO in Step S105.

In Step S106, the same processing as that in Step S106 of FIG. 5 is executed. In detail, when the combustion speed, within the cylinder 14', of the fuel that is the learning target is equal to or more than the second threshold, the answer is determined to be YES in Step S106, that is, it is determined by the fuel property determination unit 40h (refer to FIG. 2) that water is not included in the fuel that is the learning target, and the processing proceeds to Step S208. On the other hand, when the combustion speed, within the cylinder 14', of the fuel that is the learning target is smaller than the second threshold, the answer is determined to be NO in Step S106, that is, it is determined by the fuel property determination unit 40h that water is included in the fuel that is the learning target, and the processing proceeds to Step S107. In the example illustrated in FIG. 7, in a case where water is included in the fuel and the value CSw of the combustion speed parameter is calculated, the answer is determined to be NO in Step S106. On the other hand, in a case where alcohol is included in the fuel and the value CSa of the combustion speed parameter is calculated, the answer is determined to be YES in Step S106.

In Step S107, the same processing as that in Step S107 of FIG. 5 is executed, and the processing proceeds to Step S208. In Step S208, the EGR valve control is executed by the EGR valve control unit 40g (refer to FIG. 2). In detail, during the transient operation of the internal combustion engine 10 (refer to FIG. 1), in Step S208, for example, the EGR valve feedforward control of using the combustion limit EGR rate (refer to the vertical axis of FIG. 7), which is obtained from the value of the combustion speed parameter (refer to the horizontal axis of FIG. 7) showing the combustion speed of the fuel within the cylinder 14' (refer to FIG. 1) calculated in Step S204 and the third relationship illustrated by the straight line L3 in FIG. 7, as the EGR valve feedforward control target value, is executed by the EGR valve control unit 40g.

Specifically, in the example illustrated in FIG. 7, in a case where the value CSref (refer to FIG. 7) of the combustion speed parameter showing the combustion speed of the fuel within the cylinder 14' (refer to FIG. 1) is calculated in Step S204, the answer is determined to be YES in Step S105 as described above. Next, in Step S208, during the transient operation of the internal combustion engine 10 (refer to FIG. 1), the EGR valve feedforward control of using the combustion limit EGR rate EGRref (refer to FIG. 7) corresponding to the value CSref of the combustion speed parameter as the EGR valve feedforward control target value is executed by the EGR valve control unit 40g (refer to FIG. 2). Additionally, in the example illustrated in FIG. 7, in a case where the value CSa (refer to FIG. 7) of the combustion speed parameter showing the combustion speed of the fuel within the cylinder 14' is calculated in Step S204, the answer is determined to be NO in Step S105 as described above.

Next, the answer is determined to be YES in Step S106 as described above. Next, in Step S208, during the transient operation of the internal combustion engine 10, the EGR valve feedforward control of using the combustion limit EGR rate EGRa (refer to FIG. 7) corresponding to the value CSa of the combustion speed parameter as the EGR valve feedforward control target value is executed by the EGR valve control unit 40g. Otherwise, in the example illustrated in FIG. 7, in a case where the value CSw (refer to FIG. 7) of the combustion speed parameter showing the combustion speed of the fuel within the cylinder 14' is calculated in Step S204, the answer is determined to be NO in Step S105 as described above. Next, the answer is determined to be NO in Step S106 as described above. Next, Step S107 is executed as described above. Next, in Step S208, during the transient operation of the internal combustion engine 10, the EGR valve feedforward control of using the combustion limit EGR rate EGRw (refer to FIG. 7) corresponding to the value CSw of the combustion speed parameter as the EGR valve feedforward control target value is executed by the EGR valve control unit 40g.

In detail, during the steady operation of the internal combustion engine 10 (refer to FIG. 1), in Step S208, for example, the EGR valve feedback control of using the value of the combustion limit combustion speed parameter (refer to the vertical axis of FIG. 7), which is obtained from the value of the combustion speed parameter (refer to the horizontal axis of FIG. 7) showing the combustion speed of the fuel within the cylinder 14' (refer to FIG. 1) calculated in Step S204 and the fourth relationship illustrated by the straight line L4 in FIG. 7, as the EGR valve feedback control target value, is executed by the EGR valve control unit 40g (refer to FIG. 2).

Specifically, in the example illustrated in FIG. 7, in a case where the value CSref (refer to FIG. 7) of the combustion speed parameter showing the combustion speed of the fuel within the cylinder 14' (refer to FIG. 1) is calculated in Step S204, the answer is determined to be YES in Step S105 as described above. Next, in Step S208, during the steady operation of the internal combustion engine 10 (refer to FIG. 1), the EGR valve feedback control of using the value CSref" of the combustion limit combustion speed parameter (refer to FIG. 7) corresponding to the value CSref of the combustion speed parameter as the EGR valve feedback control target value is executed by the EGR valve control unit 40g (refer to FIG. 2). Additionally, in the example illustrated in FIG. 7, in a case where the value CSa (refer to FIG. 7) of the combustion speed parameter showing the combustion speed of the fuel within the cylinder 14' is calculated in Step S204, the answer is determined to be NO in Step S105 as described above. Next, the answer is determined to be YES in Step S106 as described above. Next, in Step S208, during the steady operation of the internal combustion engine 10, the EGR valve feedback control of using the value CSa" (refer to FIG. 7) of the combustion limit combustion speed parameter corresponding to the value CSa of the combustion speed parameter as the EGR valve feedback control target value is executed by the EGR valve control unit 40g. Otherwise, in the example illustrated in FIG. 7, in a case where the value CSw (refer to FIG. 7) of the combustion speed parameter showing the combustion speed of the fuel within the cylinder 14' is calculated in Step S204, the answer is determined to be NO in Step S105 as described above. Next, the answer is determined to be NO in Step S106 as described above. Next, Step S107 is executed as described above. Next, in Step S208, during the steady operation of the internal combustion engine 10, the EGR valve feedback control of using the value CSw" (refer to FIG. 7) of the combustion limit combustion speed parameter corresponding to the value CSw of the combustion speed parameter as the EGR valve feedback control target value is executed by the EGR valve control unit 40g.

As described above, in the example illustrated in FIG. 8 to which the control device of the internal combustion engine of the first embodiment is applied, when the capacitance of fuel is larger than the preset first threshold Ct (refer to FIG. 6), that is, when a possibility that water is included in the fuel and a possibility that alcohol is included in the fuel are present and it cannot be discriminated whether water is included in the fuel or alcohol is included in the fuel, the answer is determined to be NO in Step S105, and the combustion speed, within the cylinder 14' (refer to FIG. 1), of the fuel that the combustion speed parameter calculated on the basis of the in-cylinder pressure P shows and the preset second threshold are compared with each other in Step S106. Moreover, in the example illustrated in FIG. 8 to which the control device of the internal combustion engine of the first embodiment is applied, when the combustion speed of the fuel within the cylinder 14' is smaller than the second threshold, in Step S106, the answer is determined to be NO and water is determined to be included in the fuel. For that reason, in the example illustrated in FIG. 8 to which the control device of the internal combustion engine of the first embodiment is applied, it can be precisely determined that water is included in the fuel. That is, in the example illustrated in FIG. 8 to which the control device of the internal combustion engine of the first embodiment is applied, a concern that it is erroneously determined that alcohol is included in the fuel irrespective of whether water is included in the fuel can be suppressed.

In the example illustrated in above-described FIG. 8 where the control device of the internal combustion engine of the first embodiment is applied, in Step S208 after Step S107 is executed, the EGR valve feedforward control of using the combustion limit EGR rate EGRw (refer to FIG. 7) as the EGR valve feedforward control target value or the EGR valve feedback control of using the value CSw" (refer to FIG. 7) of the combustion limit combustion speed parameter as the EGR valve feedback control target value, that is, the EGR valve control for executing the EGR operation in which the EGR rate becomes as large value as possible within a range where combustion does not deteriorate. However, in another example to which the control device of the internal combustion engine of the first embodiment is applied, instead, after Step S107 is executed, the EGR operation is not executed, and for example, EGR cut can also be executed. Additionally, as described above, in the example illustrated in FIG. 8 to which the control device of the internal combustion engine of the first embodiment is applied, the reporting device 48 (refer to FIG. 1) is made to operate as the determination processing to the effect that water is included in the fuel, which is executed in Step S107. However, in another example to which the control device of the internal combustion engine of the first embodiment is applied, in a case where a normal operation is continuable, for example, even if water is included in the fuel by changing an EGR valve control target value, the reporting device 48 may not be operated in Step S107. In this case, instead, for example, the processing of setting a flag to the effect that water is included in the fuel may be executed in Step S107.

In the example illustrated in FIG. 8 to which the control device of the internal combustion engine of the first embodiment is applied, in Step S208, the combustion limit EGR rate obtained from the third relationship illustrated by the straight line L3 in FIG. 7 is used as the EGR valve feedforward control target value during the transient operation, and the value of the combustion limit combustion speed parameter obtained from the fourth relationship illustrated by the straight line L4 in FIG. 7 is used as the EGR valve feedback control target value during the steady operation. However, in another example to which the control device of the internal combustion engine of the first embodiment is applied, instead, in Step S208, a value different from the combustion limit EGR rate obtained from the third relationship illustrated by the straight line L3 in FIG. 7 is used as the EGR valve feedforward control target value during the transient operation, or a value different from the value of the combustion limit combustion speed parameter obtained from the fourth relationship illustrated by the straight line L4 in FIG. 7 can also be used as the EGR valve feedback control target value during the steady operation.

In a second embodiment, the above-described first embodiment and respective examples can also be appropriately combined together.

What is claimed is:

1. A control device for an internal combustion engine, the internal combustion engine including a cylinder, an in-cylinder pressure sensor, a fuel injection valve, and an alcohol concentration sensor, the in-cylinder pressure sensor being configured to detect an in-cylinder pressure that is a combustion pressure within the cylinder, the alcohol concentration sensor being configured to detect capacitance of fuel injected from the fuel injection valve, the control device comprising:

an electronic control unit configured to:

carry out learning of fuel properties with the fuel injected from the fuel injection valve as a target;

calculate a combustion speed parameter, showing a combustion speed, within the cylinder, of the fuel that is a learning target of the fuel properties, on a basis of the in-cylinder pressure; and determine that water is included in the fuel when the capacitance of the fuel detected by the alcohol concentration sensor is larger than a preset first threshold, and when the combustion speed of the fuel within the cylinder is smaller than a preset second threshold.

2. The control device according to claim 1, wherein the electronic control unit is configured to calculate the combustion speed parameter on a basis of the in-cylinder pressure, when fuel injection amount feedback control is executed in a state where an air excess ratio serving as a fuel injection amount feedback control target value is fixed to a preset value.

3. The control device according to claim 1, wherein the internal combustion engine includes an intake passage connected to the cylinder, an exhaust passage connected to the cylinder, an exhaust gas recirculation passage that connects the intake passage and the exhaust passage together, and an exhaust gas recirculation valve arranged in the exhaust gas recirculation passage, wherein the electronic control unit is configured to calculate the combustion speed parameter on a basis of the in-cylinder pressure, when exhaust gas recirculation valve feedback control is executed in a state where an exhaust gas recirculation rate serving as an exhaust gas recirculation valve feedback control target value is fixed to a preset value larger than zero.

4. The control device according to claim 1, wherein the internal combustion engine includes a reporting device that reports an abnormality, and wherein the electronic control unit is configured to operate the reporting device when the electronic control unit has determined that water is included in the fuel that is the learning target of the fuel properties.

* * * * *